US012011851B2

(12) United States Patent
Datema et al.

(10) Patent No.: US 12,011,851 B2
(45) **Date of Patent: *Jun. 18, 2024**

(54) CONCRETE DRUM MODES

(71) Applicant: Oshkosh Corporation, Oshkosh, WI (US)

(72) Inventors: Bryan S. Datema, Rochester, MN (US); Cody D. Clifton, Oshkosh, WI (US); Zhenyi Wei, Oshkosh, WI (US); Kevin Dunn, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,679

(22) Filed: May 5, 2023

(65) Prior Publication Data

US 2023/0271347 A1 Aug. 31, 2023

Related U.S. Application Data

(63) Continuation of application No. 16/743,761, filed on Jan. 15, 2020, now Pat. No. 11,679,529.

(60) Provisional application No. 62/793,655, filed on Jan. 17, 2019.

(51) Int. Cl.
*B28C 5/42* (2006.01)

(52) U.S. Cl.
CPC ............ *B28C 5/422* (2013.01); *B28C 5/4237* (2013.01); *B28C 5/4248* (2013.01); *B28C 5/4272* (2013.01)

(58) Field of Classification Search
CPC ..... B28C 5/422; B28C 5/4237; B28C 5/4248; B28C 5/4272; B28C 5/4244; B28C 7/02
See application file for complete search history.

(56) References Cited

U.S. PATENT DOCUMENTS

| | | | | |
|---|---|---|---|---|
| D737,866 | S | 9/2015 | Datema et al. | |
| D772,306 | S | 11/2016 | Datema et al. | |
| 10,987,829 | B2 * | 4/2021 | Datema | B28C 7/022 |
| 11,413,787 | B2 | 8/2022 | Datema et al. | |
| 11,679,529 | B2 * | 6/2023 | Datema | B28C 5/4244 366/2 |
| 11,806,896 | B2 * | 11/2023 | Datema | B28C 5/422 |
| 11,858,172 | B2 * | 1/2024 | Datema | G05D 13/00 |
| 2005/0004733 | A1 * | 1/2005 | Pillar | B28C 5/4206 701/50 |
| 2005/0131600 | A1 * | 6/2005 | Quigley | G01M 17/00 701/32.8 |
| 2008/0205188 | A1 | 8/2008 | Lindblom et al. | |
| 2009/0050438 | A1 | 2/2009 | Gillmore et al. | |
| 2009/0050439 | A1 | 2/2009 | Gillmore et al. | |

(Continued)

*Primary Examiner* — Charles Cooley
(74) *Attorney, Agent, or Firm* — Foley & Lardner LLP

(57) ABSTRACT

A concrete mixer vehicle includes a mixer drum, a chute, and a controller. The mixer drum has an inner volume configured to hold a mixture for transportation and placement. The chute is configured to receive mixture exiting the mixer drum and direct the mixture. The controller is configured to receive a selected mode of operation of the mixer drum and the chute. The selected mode of operation is selected from a set of multiple modes of operation of the mixer drum and the chute. The controller is configured to adjust an operation of at least one of the mixer drum or the chute to cause at least one of the mixer drum or the chute to operate according to the selected mode of operation.

20 Claims, 9 Drawing Sheets

(56) References Cited

U.S. PATENT DOCUMENTS

| | | | | |
|---|---|---|---|---|
| 2009/0154287 | A1 | 6/2009 | Lindblom et al. | |
| 2011/0058446 | A1 | 3/2011 | Khouri | |
| 2013/0107656 | A1 | 5/2013 | Datema et al. | |
| 2015/0159564 | A1 | 6/2015 | Wildgrube et al. | |
| 2015/0246331 | A1 | 9/2015 | Broker et al. | |
| 2017/0297425 | A1 | 10/2017 | Wildgrube et al. | |
| 2017/0361491 | A1 | 12/2017 | Datema et al. | |
| 2017/0361492 | A1* | 12/2017 | Datema | G05D 13/00 |
| 2018/0250847 | A1 | 9/2018 | Wurtz et al. | |
| 2019/0091890 | A1 | 3/2019 | Rocholl et al. | |
| 2019/0121353 | A1 | 4/2019 | Datema et al. | |
| 2019/0217698 | A1 | 7/2019 | Broker et al. | |
| 2019/0325220 | A1 | 10/2019 | Wildgrube et al. | |
| 2019/0344475 | A1 | 11/2019 | Datema et al. | |
| 2020/0078986 | A1 | 3/2020 | Clifton et al. | |
| 2020/0094671 | A1 | 3/2020 | Wildgrube et al. | |
| 2021/0229321 | A1 | 7/2021 | Datema et al. | |
| 2022/0332014 | A1* | 10/2022 | Datema | B28C 5/4217 |
| 2022/0388198 | A1 | 12/2022 | Datema et al. | |
| 2022/0388199 | A1 | 12/2022 | Datema | |
| 2023/0145238 | A1* | 5/2023 | Clifton | G06F 8/65<br>701/29.3 |
| 2023/0271347 | A1* | 8/2023 | Datema | B28C 5/4237<br>366/2 |

* cited by examiner

CONCRETE DRUM MODES

CROSS-REFERENCE TO RELATED PATENT APPLICATION

This application is a continuation of U.S. application Ser. No. 16/743,761, filed Jan. 15, 2020, which claims the benefit of and priority to U.S. Provisional Patent Application No. 62/793,655, filed Jan. 17, 2019, which is incorporated herein by reference in its entirety.

BACKGROUND

Concrete mixer vehicles are configured to receive, mix, and transport wet concrete or a combination of ingredients that when mixed form wet concrete to a job site. Concrete mixer vehicles include a rotatable mixer drum that mixes the concrete disposed therein.

SUMMARY

One implementation of the present disclosure is a concrete mixer vehicle, according to an exemplary embodiment. The concrete mixer vehicle includes a mixer drum, a chute, and a controller. The mixer drum has an inner volume configured to hold a mixture for transportation and placement. The chute is configured to receive mixture exiting the mixer drum and direct the mixture. The controller is configured to receive a selected mode of operation of the mixer drum and the chute. The selected mode of operation is selected from a set of multiple modes of operation of the mixer drum and the chute. The controller is configured to adjust an operation of at least one of the mixer drum or the chute to cause at least one of the mixer drum or the chute to operate according to the selected mode of operation.

Another implementation of the present disclosure is a method for transitioning a concrete mixer vehicle between a first mode and a second mode, according to an exemplary embodiment. The method includes operating at least one of a mixer drum or a chute according to the first mode of operation, operating at least one of the mixer drum or the chute according to the first mode of operation includes driving the mixer drum at a first mode-specific drum speed in a first mode-specific drum direction, and operating the chute at a first mode-specific chute speed. The method also includes identifying an occurrence of an event that indicates the concrete mixer vehicle should be transitioned into the second mode. The method also includes operating at least one of the mixer drum or the chute according to the second mode of operation. Operating at least one of the mixer drum or the chute according to the second mode of operation includes driving the mixer drum at a second mode-specific drum speed in a second mode-specific drum direction, and operating the chute at a second mode-specific chute speed. At least one of the second mode-specific drum speed is different than the first mode-specific drum speed, the second mode-specific drum direction is different than the first mode-specific drum direction, or the second mode-specific chute speed is different than the first mode-specific chute speed.

Another implementation of the present disclosure is a control system for a concrete mixer vehicle, according to an exemplary embodiment. The control system includes a controller having a processing circuit configured to receive a request from a user interface to transition the concrete mixer vehicle into a selected mode of operation. The selected mode of operation is one of multiple different modes of operation.

The processing circuit is also configured to select a set of operations for a mixer drum of the concrete mixer vehicle and a set of operations for a chute of the concrete mixer vehicle corresponding to the selected mode of operation. The processing circuit is also configured to operate the mixer drum according to the set of operations for the mixer drum and the chute according to the set of operations for the chute. The set of operations for the mixer drum include driving the mixer drum at a mode-specific speed for at least one of a predetermined amount of time, a predetermined angular distance, or a predetermined number of revolutions.

BRIEF DESCRIPTION OF THE DRAWINGS

The disclosure will become more fully understood from the following detailed description, taken in conjunction with the accompanying FIGURES, wherein like reference numerals refer to like elements, in which.

DETAILED DESCRIPTION

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

Referring generally to the FIGURES, a system and a controller for a concrete mixer truck or a concrete placement vehicle are shown, according to an exemplary embodiment. The system and/or the controller facilitate selection and transition between various predefined modes of operation of one or more controllable elements. In some embodiments, the various predefined modes of operation include an add water mode, a spreader mode, an admixture mode, a smooth mode, a wet load mode, and an aggressive mode. The various modes may be for different concrete placement and concrete transit environments setup to minimize operator interaction while enhancing the experience for a specific instant, according to some embodiments. Based on load, location, environment, job, etc., operators of concrete mixing trucks need to hold various skill sets to manually control the concrete mixer truck to accomplish various functions in different situations, according to some embodiments. The system and the controller facilitate simple transitioning of the concrete mixer truck between various predefined modes of operation to automate many of the operations which the operator may have to do manually in other systems, according to some embodiments. The predefined modes of operation and the automated operations therein increase repeatability, and help remove human errors which may occur due to distractions at a plant, while in transit and on the jobsite.

Figure 1:
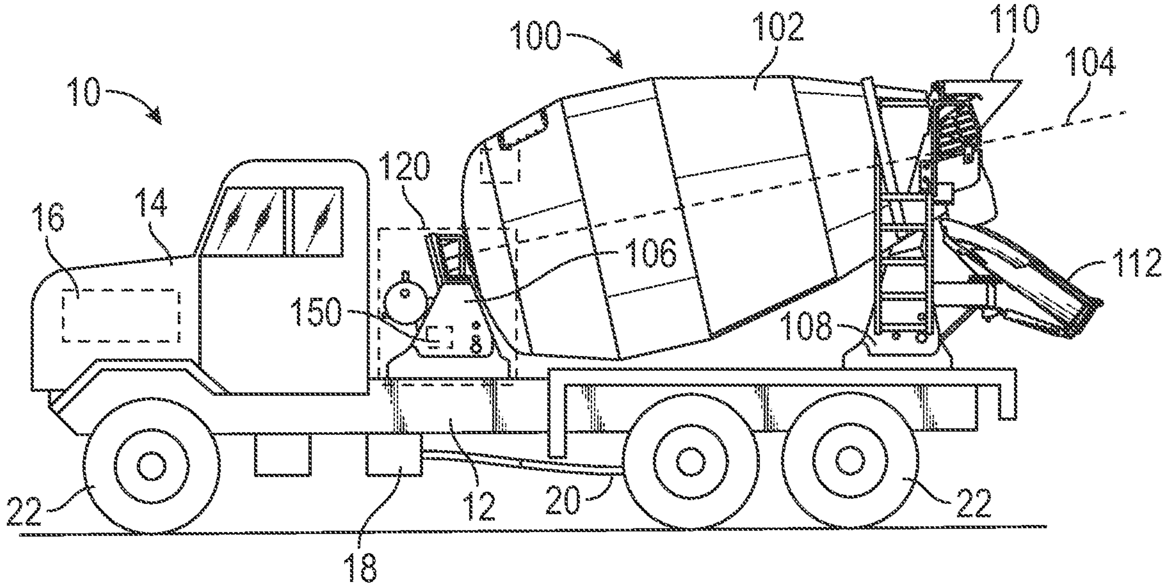
FIG. 1 is a side view of a concrete mixer truck with a drum assembly and a control system, according to an exemplary embodiment.

According to the exemplary embodiment shown in FIGS. 1-5, a vehicle, shown as concrete mixer truck 10, includes a drum assembly, shown as drum assembly 100, and a control system, shown as drum control system 150. According to an exemplary embodiment, the concrete mixer truck 10 is configured as a rear-discharge concrete mixer truck. In other embodiments, the concrete mixer truck 10 is configured as a front-discharge concrete mixer truck. As shown in FIG. 1, the concrete mixer truck 10 includes a chassis, shown as frame 12, and a cab, shown as cab 14, coupled to the frame 12 (e.g., at a front end thereof, etc.). The drum assembly 100 is coupled to the frame 12 and disposed behind the cab 14 (e.g., at a rear end thereof, etc.), according to the exemplary embodiment shown in FIG. 1. In other embodiments, at least a portion of the drum assembly 100 extends in front of the cab 14. The cab 14 may include various components to facilitate operation of the concrete mixer truck 10 by an operator (e.g., a seat, a steering wheel, hydraulic controls, a user interface, switches, buttons, dials, etc.).

Figure 3:
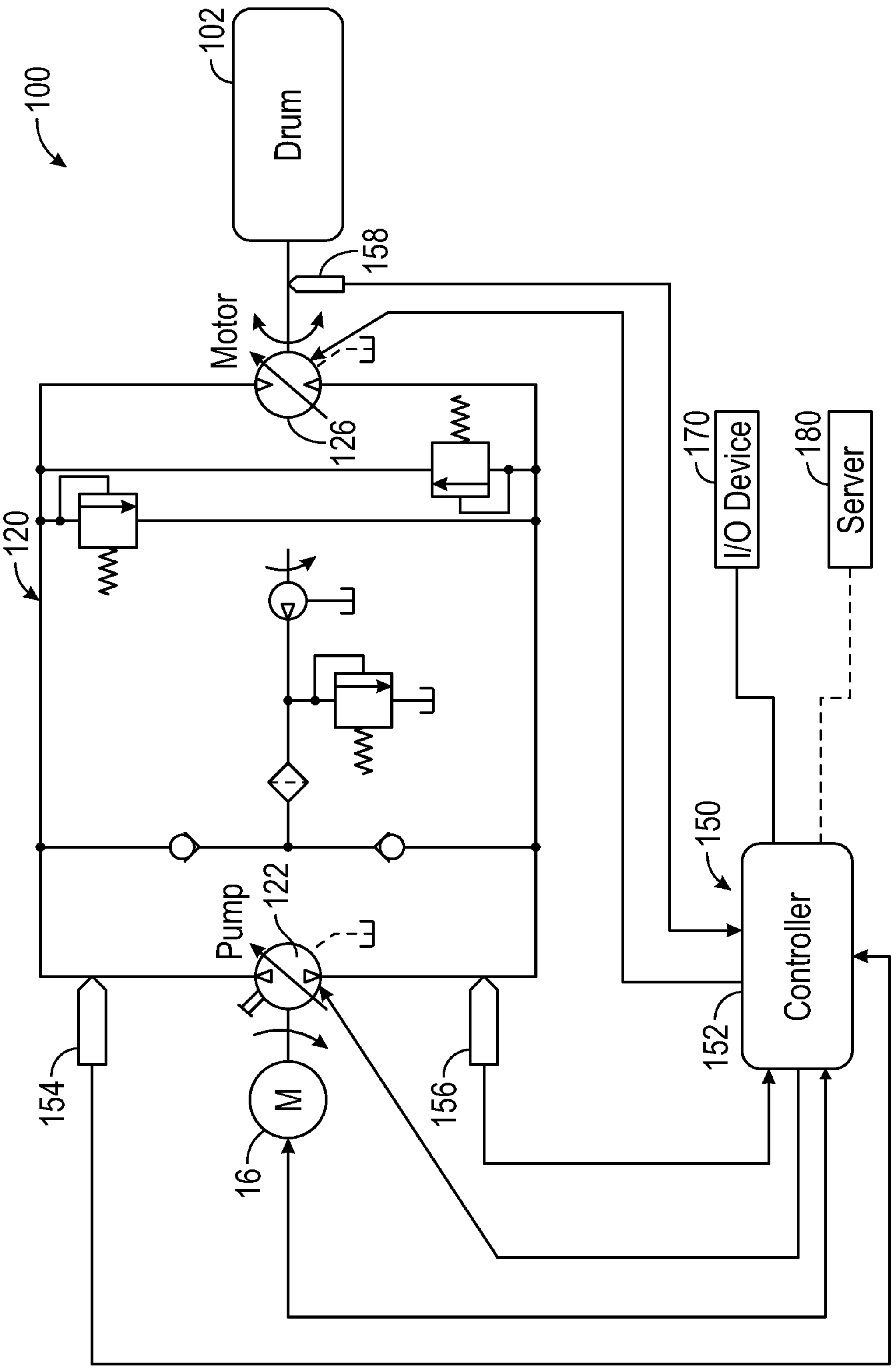
FIG. 3 is a schematic diagram of a drum drive system of the concrete mixer truck of FIG. 1, according to an exemplary embodiment.
Figure 4:
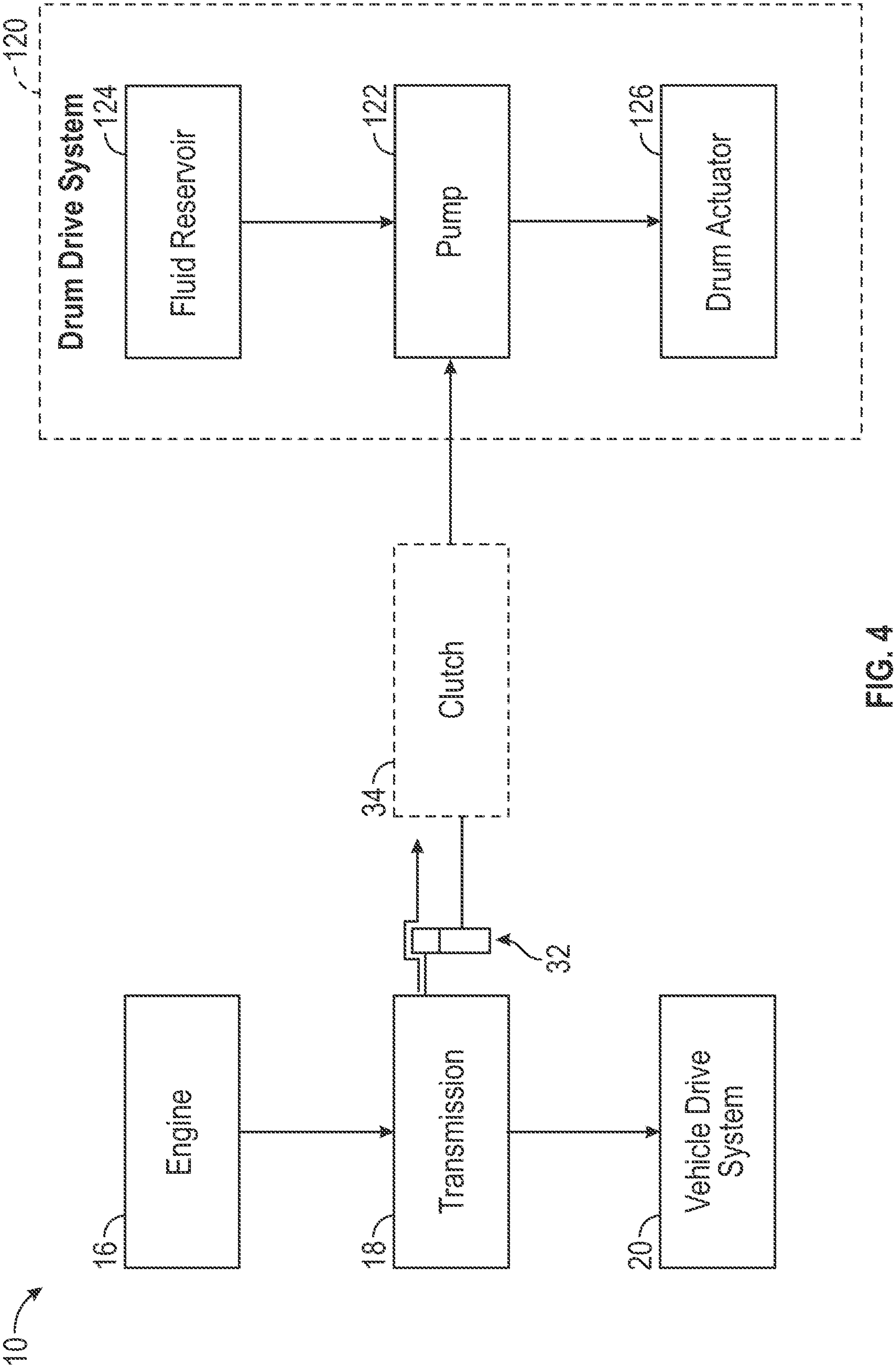
FIG. 4 is a power flow diagram for the concrete mixer truck of FIG. 1 having a drum drive system that is selectively coupled to a transmission with a clutch, according to an exemplary embodiment.
Figure 5:
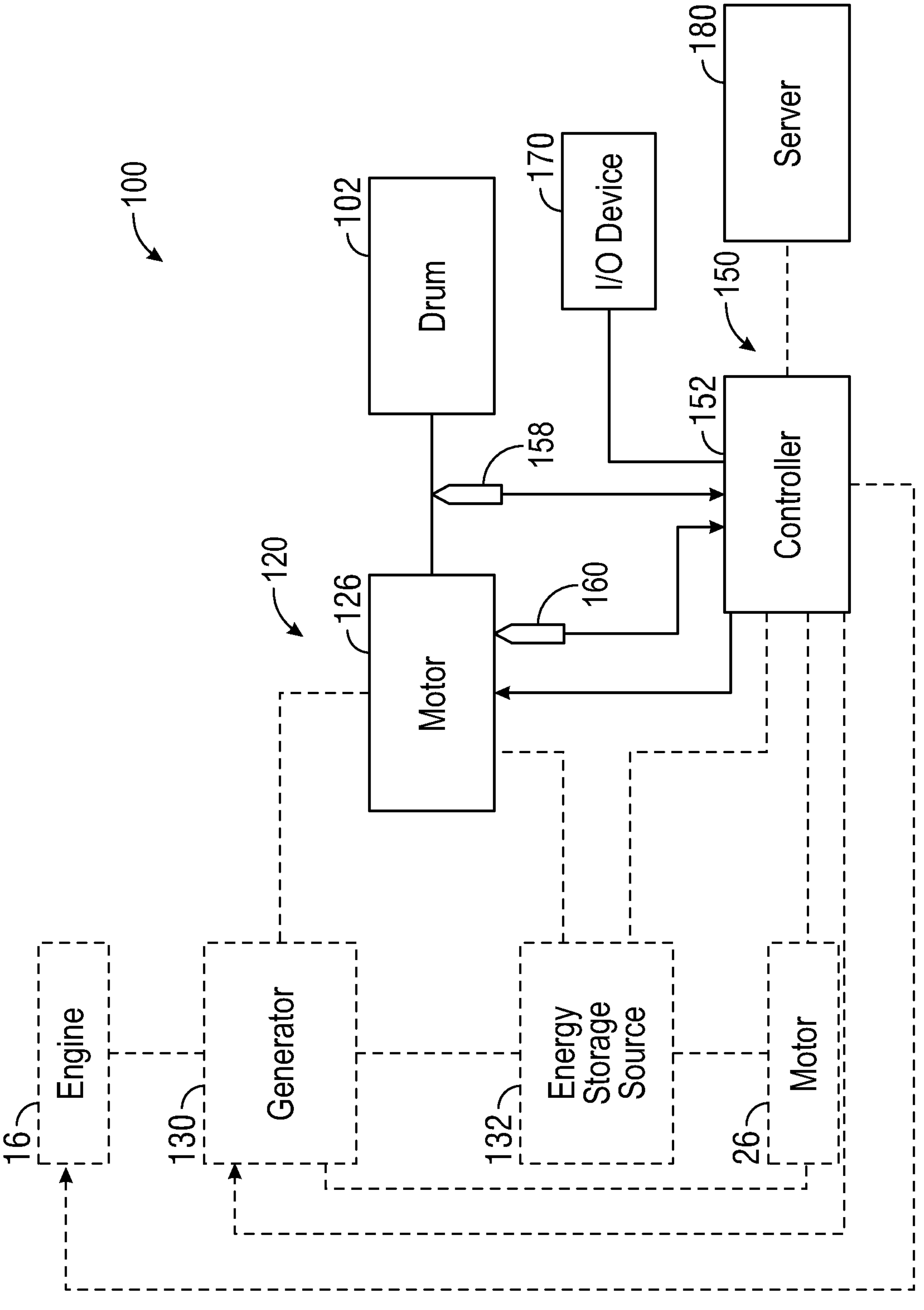
FIG. 5 is a schematic diagram of a drum drive system of the concrete mixer truck of FIG. 1, according to another exemplary embodiment.

As shown in FIGS. 1, 3, and 4, the concrete mixer truck 10 includes a prime mover, shown as engine 16. As shown in FIG. 1, the engine 16 is coupled to the frame 12 at a position beneath the cab 14. The engine 16 may be configured to utilize one or more of a variety of fuels (e.g., gasoline, diesel, bio-diesel, ethanol, natural gas, etc.), according to various exemplary embodiments. According to an alternative embodiment, as shown in FIG. 5 and described in more detail herein, the prime mover additionally or alternatively includes one or more electric motors and/or generators, which may be coupled to the frame 12 (e.g., a hybrid vehicle, an electric vehicle, etc.). The electric motors may consume electrical power from an on-board storage device (e.g., batteries, ultra-capacitors, etc.), from an on-board generator (e.g., an internal combustion engine, a genset, etc.), and/or from an external power source (e.g., overhead power lines, etc.) and provide power to systems of the concrete mixer truck 10.

As shown in FIGS. 1 and 4, the concrete mixer truck 10 includes a power transfer device, shown as transmission 18. In one embodiment, the engine 16 produces mechanical power (e.g., due to a combustion reaction, etc.) that flows into the transmission 18. As shown in FIGS. 1 and 4, the concrete mixer truck 10 includes a first drive system, shown as vehicle drive system 20, that is coupled to the transmission 18. The vehicle drive system 20 may include drive shafts, differentials, and other components coupling the transmission 18 with a ground surface to move the concrete mixer truck 10. As shown in FIG. 1, the concrete mixer truck 10 includes a plurality of tractive elements, shown as wheels 22, that engage a ground surface to move the concrete mixer truck 10. In one embodiment, at least a portion of the mechanical power produced by the engine 16 flows through the transmission 18 and into the vehicle drive system 20 to power at least a portion of the wheels 22 (e.g., front wheels, rear wheels, etc.). In one embodiment, energy (e.g., mechanical energy, etc.) flows along a first power path defined from the engine 16, through the transmission 18, and to the vehicle drive system 20.

Figure 2:
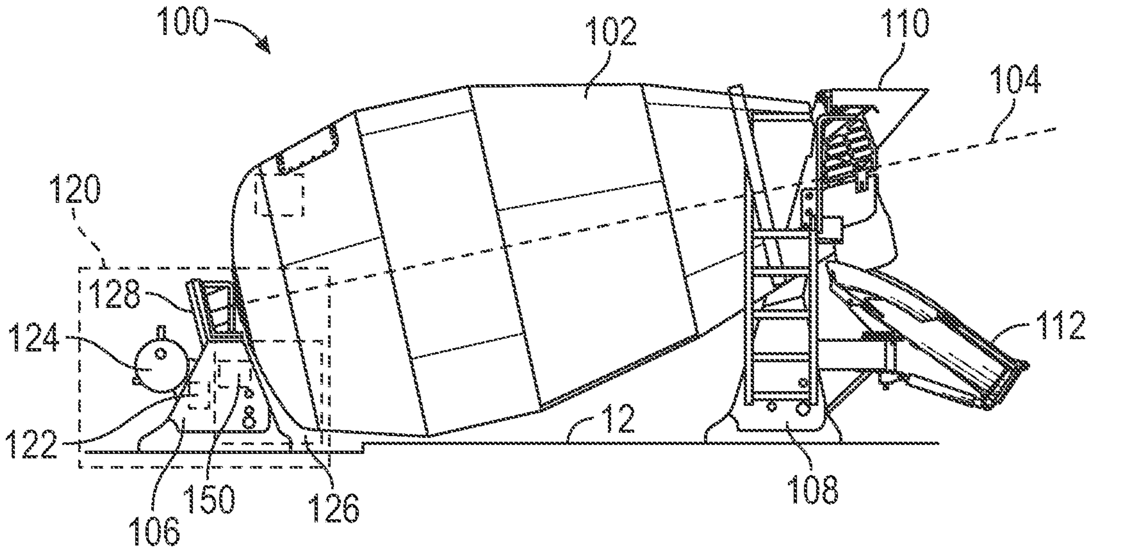
FIG. 2 is a detailed side view of the drum assembly of the concrete mixer truck of FIG. 1, according to an exemplary embodiment.

As shown in FIGS. 1-3 and 5, the drum assembly 100 of the concrete mixer truck 10 includes a drum, shown as mixer drum 102. The mixer drum 102 is coupled to the frame 12 and disposed behind the cab 14 (e.g., at a rear and/or middle of the frame 12, etc.). As shown in FIGS. 1-5, the drum assembly 100 includes a second drive system, shown as drum drive system 120, that is coupled to the frame 12. As shown in FIGS. 1 and 2, the concrete mixer truck 10 includes a first support, shown as front pedestal 106, and a second support, shown as rear pedestal 108. According to an exemplary embodiment, the front pedestal 106 and the rear pedestal 108 cooperatively couple (e.g., attach, secure, etc.) the mixer drum 102 to the frame 12 and facilitate rotation of the mixer drum 102 relative to the frame 12. In an alternative embodiment, the drum assembly 100 is configured as a stand-alone mixer drum that is not coupled (e.g., fixed, attached, etc.) to a vehicle. In such an embodiment, the drum assembly 100 may be mounted to a stand-alone frame. The stand-alone frame may be a chassis including wheels that assist with the positioning of the stand-alone mixer drum on a worksite. Such a stand-alone mixer drum may also be detachably coupled to and/or capable of being loaded onto a vehicle such that the stand-alone mixer drum may be transported by the vehicle.

As shown in FIGS. 1 and 2, the mixer drum 102 defines a central, longitudinal axis, shown as axis 104. According to an exemplary embodiment, the drum drive system 120 is configured to selectively rotate the mixer drum 102 about the axis 104. As shown in FIGS. 1 and 2, the axis 104 is angled relative to the frame 12 such that the axis 104 intersects with the frame 12. According to an exemplary embodiment, the axis 104 is elevated from the frame 12 at an angle in the range of five degrees to twenty degrees. In other embodiments, the axis 104 is elevated by less than five degrees (e.g., four degrees, three degrees, etc.) or greater than twenty degrees (e.g., twenty-five degrees, thirty degrees, etc.). In an alternative embodiment, the concrete mixer truck 10 includes an actuator positioned to facilitate selectively adjusting the axis 104 to a desired or target angle (e.g., manually in response to an operator input/command, automatically according to a control scheme, etc.).

As shown in FIGS. 1 and 2, the mixer drum 102 of the drum assembly 100 includes an inlet, shown as hopper 110, and an outlet, shown as chute 112. According to an exemplary embodiment, the mixer drum 102 is configured to receive a mixture, such as a concrete mixture (e.g., cementitious material, aggregate, sand, etc.), with the hopper 110. The mixer drum 102 may include a mixing element (e.g., fins, etc.) positioned within the interior thereof. The mixing element may be configured to (i) agitate the contents of mixture within the mixer drum 102 when the mixer drum 102 is rotated by the drum drive system 120 in a first direction (e.g., counterclockwise, clockwise, etc.) and (ii) drive the mixture within the mixer drum 102 out through the chute 112 when the mixer drum 102 is rotated by the drum drive system 120 in an opposing second direction (e.g., clockwise, counterclockwise, etc.).

According to the exemplary embodiment shown in FIGS. 2-4, the drum drive system is a hydraulic drum drive system.

As shown in FIGS. 2-4, the drum drive system 120 includes a pump, shown as pump 122; a reservoir, shown as fluid reservoir 124, fluidly coupled to the pump 122; and an actuator, shown as drum motor 126. As shown in FIGS. 3 and 4, the pump 122 and the drum motor 126 are fluidly coupled. According to an exemplary embodiment, the drum motor 126 is a hydraulic motor, the fluid reservoir 124 is a hydraulic fluid reservoir, and the pump 122 is a hydraulic pump. The pump 122 may be configured to pump fluid (e.g., hydraulic fluid, etc.) stored within the fluid reservoir 124 to drive the drum motor 126.

According to an exemplary embodiment, the pump 122 is a variable displacement hydraulic pump (e.g., an axial piston pump, etc.) and has a pump stroke that is variable. The pump 122 may be configured to provide hydraulic fluid at a flow rate that varies based on the pump stroke (e.g., the greater the pump stroke, the greater the flow rate provided to the drum motor 126, etc.). The pressure of the hydraulic fluid provided by the pump 122 may also increase in response to an increase in pump stroke (e.g., where pressure may be directly related to work load, higher flow may result in higher pressure, etc.). The pressure of the hydraulic fluid provided by the pump 122 may alternatively not increase in response to an increase in pump stroke (e.g., in instances where there is little or no work load, etc.). The pump 122 may include a throttling element (e.g., a swash plate, etc.). The pump stroke of the pump 122 may vary based on the orientation of the throttling element. In one embodiment, the pump stroke of the pump 122 varies based on an angle of the throttling element (e.g., relative to an axis along which the pistons move within the axial piston pump, etc.). By way of example, the pump stroke may be zero where the angle of the throttling element is equal to zero. The pump stroke may increase as the angle of the throttling element increases. According to an exemplary embodiment, the variable pump stroke of the pump 122 provides a variable speed range of up to about 10:1. In other embodiments, the pump 122 is configured to provide a different speed range (e.g., greater than 10:1, less than 10:1, etc.).

In one embodiment, the throttling element of the pump 122 is movable between a stroked position (e.g., a maximum stroke position, a partially stroked position, etc.) and a destroked position (e.g., a minimum stroke position, a partially destroked position, etc.). According to an exemplary embodiment, an actuator is coupled to the throttling element of the pump 122. The actuator may be positioned to move the throttling element between the stroked position and the destroked position. In some embodiments, the pump 122 is configured to provide no flow, with the throttling element in a non-stroked position, in a default condition (e.g., in response to not receiving a stroke command, etc.). The throttling element may be biased into the non-stroked position. In some embodiments, the drum control system 150 is configured to provide a first command signal. In response to receiving the first command signal, the pump 122 (e.g., the throttling element by the actuator thereof, etc.) may be selectively reconfigured into a first stroke position (e.g., stroke in one direction, a destroked position, etc.). In some embodiments, the drum control system 150 is configured to additionally or alternatively provide a second command signal. In response to receiving the second command signal, the pump 122 (e.g., the throttling element by the actuator thereof, etc.) may be selectively reconfigured into a second stroke position (e.g., stroke in an opposing second direction, a stroked position, etc.). The pump stroke may be related to the position of the throttling element and/or the actuator.

According to another exemplary embodiment, a valve is positioned to facilitate movement of the throttling element between the stroked position and the destroked position. In one embodiment, the valve includes a resilient member (e.g., a spring, etc.) configured to bias the throttling element in the destroked position (e.g., by biasing movable elements of the valve into positions where a hydraulic circuit actuates the throttling element into the destroked positions, etc.). Pressure from fluid flowing through the pump 122 may overcome the resilient member to actuate the throttling element into the stroked position (e.g., by actuating movable elements of the valve into positions where a hydraulic circuit actuates the throttling element into the stroked position, etc.).

As shown in FIG. 4, the concrete mixer truck 10 includes a power takeoff unit, shown as power takeoff unit 32, that is coupled to the transmission 18. In another embodiment, the power takeoff unit 32 is coupled directly to the engine 16. In one embodiment, the transmission 18 and the power takeoff unit 32 include mating gears that are in meshing engagement. A portion of the energy provided to the transmission 18 flows through the mating gears and into the power takeoff unit 32, according to an exemplary embodiment. In one embodiment, the mating gears have the same effective diameter. In other embodiments, at least one of the mating gears has a larger diameter, thereby providing a gear reduction or a torque multiplication and increasing or decreasing the gear speed.

As shown in FIG. 4, the power takeoff unit 32 is selectively coupled to the pump 122 with a clutch 34. In other embodiments, the power takeoff unit 32 is directly coupled to the pump 122 (e.g., without clutch 34, etc.). In some embodiments, the concrete mixer truck 10 does not include the clutch 34. By way of example, the power takeoff unit 32 may be directly coupled to the pump 122 (e.g., a direct configuration, a non-clutched configuration, etc.). According to an alternative embodiment, the power takeoff unit 32 includes the clutch 34 (e.g., a hot shift PTO, etc.). In one embodiment, the clutch 34 includes a plurality of clutch discs. When the clutch 34 is engaged, an actuator forces the plurality of clutch discs into contact with one another, which couples an output of the transmission 18 with the pump 122. In one embodiment, the actuator includes a solenoid that is electronically actuated according to a clutch control strategy. When the clutch 34 is disengaged, the pump 122 is not coupled to (i.e., is isolated from) the output of the transmission 18. Relative movement between the clutch discs or movement between the clutch discs and another component of the power takeoff unit 32 may be used to decouple the pump 122 from the transmission 18.

In one embodiment, energy flows along a second power path defined from the engine 16, through the transmission 18 and the power takeoff unit 32, and into the pump 122 when the clutch 34 is engaged. When the clutch 34 is disengaged, energy flows from the engine 16, through the transmission 18, and into the power takeoff unit 32. The clutch 34 selectively couples the pump 122 to the engine 16, according to an exemplary embodiment. In one embodiment, energy along the first flow path is used to drive the wheels 22 of the concrete mixer truck 10, and energy along the second flow path is used to operate the drum drive system 120 (e.g., power the pump 122, etc.). By way of example, the clutch 34 may be engaged such that energy flows along the second flow path when the pump 122 is used to provide hydraulic fluid to the drum motor 126. When the pump 122 is not used to drive the mixer drum 102 (e.g., when the mixer drum 102 is empty, etc.), the clutch 34 may be selectively disengaged, thereby conserving energy. In embodiments without clutch 34, the mixer drum 102 may continue turning (e.g., at low speed) when empty.

The drum motor 126 is positioned to drive the rotation of the mixer drum 102. In some embodiments, the drum motor 126 is a fixed displacement motor. In some embodiments, the drum motor 126 is a variable displacement motor. In one embodiment, the drum motor 126 operates within a variable speed range up to about 3:1 or 4:1. In other embodiments, the drum motor 126 is configured to provide a different speed range (e.g., greater than 4:1, less than 3:1, etc.). According to an exemplary embodiment, the speed range of the drum drive system 120 is the product of the speed range of the pump 122 and the speed range of the drum motor 126. The drum drive system 120 having a variable pump 122 and a variable drum motor 126 may thereby have a speed range that reaches up to 30:1 or 40:1 (e.g., without having to operate the engine 16 at a high idle condition, etc.). According to an exemplary embodiment, increased speed range of the drum drive system 120 having a variable displacement motor and a variable displacement pump relative to a drum drive system having a fixed displacement motor frees up boundary limits for the engine 16, the pump 122, and the drum motor 126. Advantageously, with the increased capacity of the drum drive system 120, the engine 16 does not have to run at either high idle or low idle during the various operating modes of the drum assembly 100 (e.g., mixing mode, discharging mode, filling mode, etc.), but rather the engine 16 may be operated at a speed that provides the most fuel efficiency and most stable torque. Also, the pump 122 and the drum motor 126 may not have to be operated at displacement extremes to meet the speed requirements for the mixer drum 102 during various applications, but can rather be modulated to the most efficient working conditions (e.g., by the drum control system 150, etc.).

As shown in FIG. 2, the drum drive system 120 includes a drive mechanism, shown as drum drive wheel 128, coupled to the mixer drum 102. The drum drive wheel 128 may be welded, bolted, or otherwise secured to the head of the mixer drum 102. The center of the drum drive wheel 128 may be positioned along the axis 104 such that the drum drive wheel 128 rotates about the axis 104. According to an exemplary embodiment, the drum motor 126 is coupled to the drum drive wheel 128 (e.g., with a belt, a chain, a gearing arrangement, etc.) to facilitate driving the drum drive wheel 128 and thereby rotate the mixer drum 102. The drum drive wheel 128 may be or include a sprocket, a cogged wheel, a grooved wheel, a smooth-sided wheel, a sheave, a pulley, or still another member. In other embodiments, the drum drive system 120 does not include the drum drive wheel 128. By way of example, the drum drive system 120 may include a gearbox that couples the drum motor 126 to the mixer drum 102. By way of another example, the drum motor 126 (e.g., an output thereof, etc.) may be directly coupled to the mixer drum 102 (e.g., along the axis 104, etc.) to rotate the mixer drum 102.

According to the exemplary embodiment shown in FIG. 5, the drum drive system 120 of the drum assembly 100 is configured to be an electric drum drive system. As shown in FIG. 5, the drum drive system 120 includes the drum motor 126, which is electrically powered to drive the mixer drum 102. By way of example, in an embodiment where the concrete mixer truck 10 has a hybrid powertrain, the engine 16 may drive a generator (e.g., with the power takeoff unit 32, etc.), shown as generator 130, to generate electrical power that is (i) stored for future use by the drum motor 126 in storage (e.g., battery cells, etc.), shown as energy storage source 132, and/or (ii) provided directly to drum motor 126 to drive the mixer drum 102. The energy storage source 132 may additionally be chargeable using a mains power connection (e.g., through a charging station, etc.). By way of another example, in an embodiment where the concrete mixer truck 10 has an electric powertrain, the engine 16 may be replaced with a main motor, shown as primary motor 26, that drives the wheels 22. The primary motor 26 and the drum motor 126 may be powered by the energy storage source 132 and/or the generator 130 (e.g., a regenerative braking system, etc.).

According to the exemplary embodiments shown in FIGS. 3 and 5, the drum control system 150 for the drum assembly 100 of the concrete mixer truck 10 includes a controller, shown as drum assembly controller 152. In one embodiment, the drum assembly controller 152 is configured to selectively engage, selectively disengage, control, and/or otherwise communicate with components of the drum assembly 100 and/or the concrete mixer truck 10 (e.g., actively control the components thereof, etc.). As shown in FIGS. 3 and 5, the drum assembly controller 152 is coupled to the engine 16, the primary motor 26, the pump 122, the drum motor 126, the generator 130, the energy storage source 132, a pressure sensor 154, a temperature sensor 156, a speed sensor 158, a motor sensor 160, an input/output ("I/O") device 170, and/or a remote server 180. In other embodiments, the drum assembly controller 152 is coupled to more or fewer components. By way of example, the drum assembly controller 152 may send and/or receive signals with the engine 16, the primary motor 26, the pump 122, the drum motor 126, the generator 130, the energy storage source 132, the pressure sensor 154, the temperature sensor 156, the speed sensor 158, the motor sensor 160, the I/O device 170, and/or the remote server 180.

The drum assembly controller 152 may be implemented as hydraulic controls, a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to an exemplary embodiment, the drum assembly controller 152 includes a processing circuit having a processor and a memory. The processing circuit may include an ASIC, one or more FPGAs, a DSP, circuits containing one or more processing components, circuitry for supporting a microprocessor, a group of processing components, or other suitable electronic processing components. In some embodiments, the processor is configured to execute computer code stored in the memory to facilitate the activities described herein. The memory may be any volatile or non-volatile computer-readable storage medium capable of storing data or computer code relating to the activities described herein. According to an exemplary embodiment, the memory includes computer code modules (e.g., executable code, object code, source code, script code, machine code, etc.) configured for execution by the processor.

According to an exemplary embodiment, the drum assembly controller 152 is configured to facilitate detecting the buildup of concrete within the mixer drum 102. By way of example, over time after various concrete discharge cycles, concrete may begin to build up and harden within the mixer drum 102. Such buildup is disadvantageous because of the increased weight of the concrete mixer truck 10 and decreased charge capacity of the mixer drum 102. Such factors may reduce the efficiency of concrete delivery.

Therefore, the concrete that has built up must be cleaned from the interior of the mixer drum 102 (i.e., using a chipping process). Typically, the buildup is monitored either (i) manually by the operator of the concrete mixer truck 10 (e.g., by inspecting the interior of the mixer drum 102, etc.) or (ii) using expensive load cells to detect a change in mass of the mixer drum 102 when empty. According to an exemplary embodiment, the drum assembly controller 152 is configured to automatically detect concrete buildup within the mixer drum 102 using sensor measurements from more cost effective sensors and processes.

Figure 6:
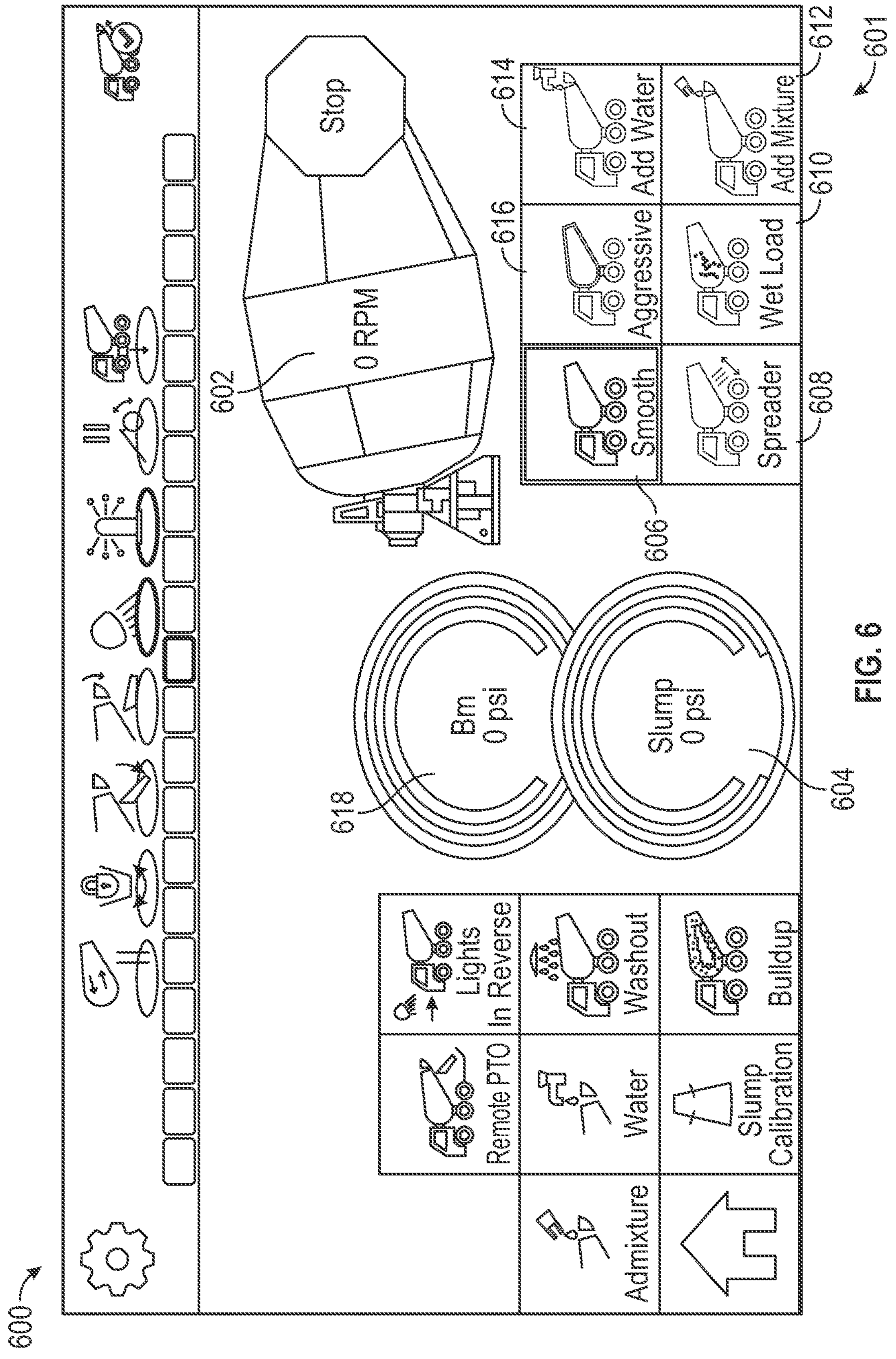
FIG. 6 is a graphical user interface provided by an interface of the concrete mixer truck of FIG. 1, according to an exemplary embodiment.
Figure 7:
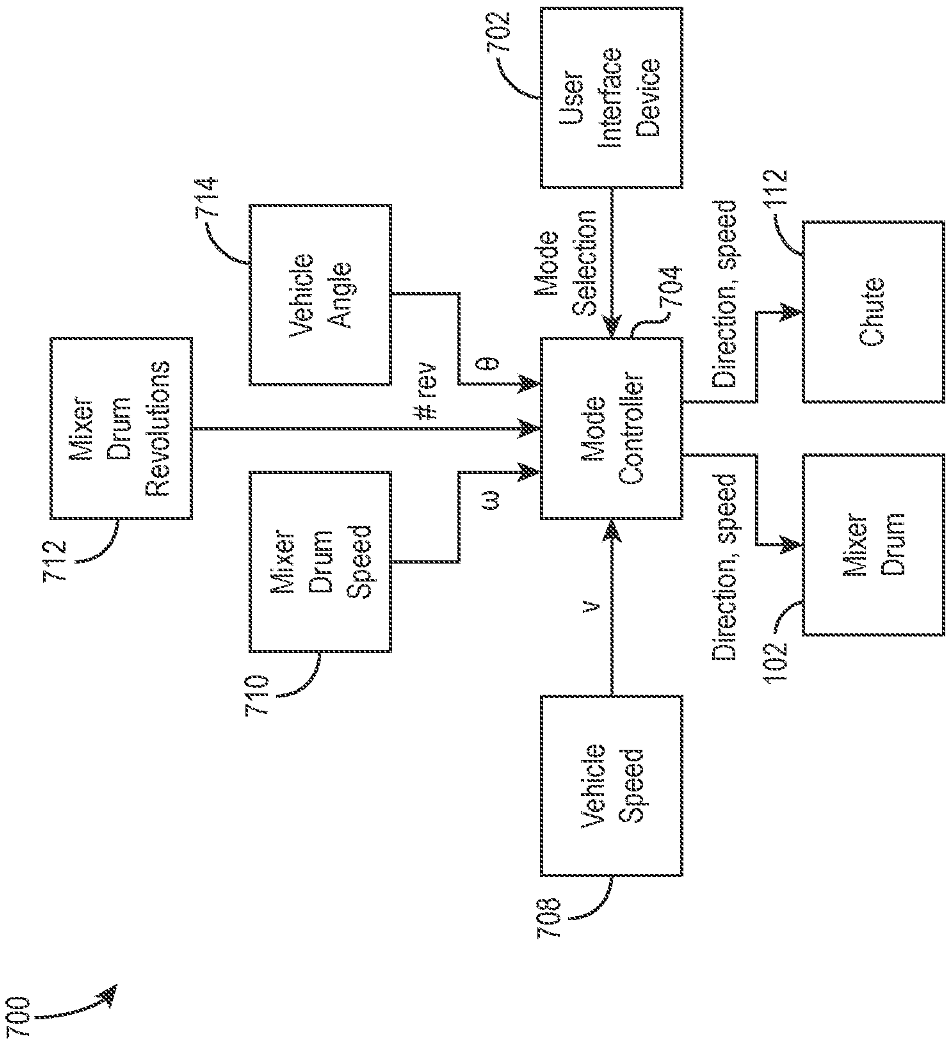
FIG. 7 is a block diagram of a system for selectably transitioning the concrete mixer truck of FIG. 1 between various predefined modes of operation, shown to include a mode controller, according to an exemplary embodiment.

FIG. 6 shows a graphical user interface (GUI) 600 which may displayed to a vehicle operator (e.g., via user interface device 702 as shown in FIG. 7), according to an exemplary embodiment. GUI 600 is shown to include graphical displays indicating a drum speed 602, a slump 604 of mixture, a pressure 618, etc. GUI 600 is configured to display various operational properties of mixer drum 102, concrete mixer truck 10, and the mixture (e.g., concrete) within mixer drum 102, according to some embodiments. GUI 600 is configured to receive various user inputs to selectably transition mixer drum 102 and/or concrete mixer truck 10 between various predetermined drum modes 601, according to some embodiments. According to some embodiments, GUI 600 includes a smooth drum mode 606, a spreader drum mode 608, a wet load drum mode 610, an admixture drum mode 612, an add water drum mode 614, and an aggressive drum mode 616. GUI 600 is configured to receive user inputs (e.g., through a touchscreen, buttons, levers, selecting devices, etc.) to select any of smooth drum mode 606, spreader drum mode 608, wet load drum mode 610, admixture drum mode 612, add water drum mode 614, and aggressive drum mode 616, according to some embodiments. In some embodiments, GUI 600 is configured to receive one or more input parameters for the selected mode in addition to the selected mode. In some embodiments, GUI 600 prompts an operator to input one or more input parameters in response to a selection of one of drum modes 601.

GUI 600 may be implemented in a display device (e.g., a user interface, a human machine interface, user interface device 702, etc.) positioned within cab 14, according to an exemplary embodiment. Drum modes 601 cause mixer drum 102 and/or chute 112 to operate according to various predefined modes for different concrete placement and concrete transit environments or to achieve desired characteristics of concrete or mixture within mixer drum 102. Advantageously, drum modes 601 may remove the need for an operator to manually adjust operations of mixer drum 102 and facilitates automated operation of the concrete mixer truck 10. Drum modes 601 facilitate a simpler operation of mixer drum 102, and facilitate a more repeatable operation of mixer drum 102, according to some embodiments.

As disclosed above, each of drum modes 601 cause mixer drum 102 and/or concrete mixer truck 10 to operate according to a predefined mode. Smooth drum mode 606 causes mixer drum 102 to operate according to a standard drum mode, according to an exemplary embodiment. In an exemplary embodiment, smooth drum mode 606 is a default operating mode of mixer drum 102. For example, mixer drum 102 may automatically transition or be transitioned into smooth drum mode 606 in response to a key cycle (e.g., an ignition of engine 16). In some embodiments, smooth drum mode 606 includes ramps and smoothing features to smoothly reduce drum momentum when a drum stop is engaged or when switching between charge and discharge.

Spreader drum mode 608 causes mixer drum 102 to operate for the purposes of spreading a cement slurry or the mixture contained in mixer drum 102, according to an exemplary embodiment. When spreader drum mode 608 is selected, mixer drum 102 and chute 112 are operated for the purpose of spreading the cement slurry, according to some embodiments. When in spreader drum mode 608, mixer drum 102 and chute 112 are operated based on speed of concrete mixer truck 10, and an angle of concrete mixer truck 10, according to some embodiments.

Wet load drum mode 610 keeps mixer drum 102 spinning faster when concrete mixer truck 10 is moving at a slower speed, according to an exemplary embodiment. This facilitates keeping mixture or concrete in mixer drum 102 farther forwards in mixer drum 102. Wet load drum mode 610 may be activated when concrete mixer truck 10 has a full load with a high slump (e.g., immediately after loading at a plant). Wet load drum mode 610 may use information such as the speed of concrete mixer truck 10 and current mixer drum speed to control speed of mixer drum 102. In some embodiments, wet load drum mode 610 uses an acceleration, pitch, roll, etc., of concrete mixer truck 10 to control speed of mixer drum 102 to prevent concrete/mixture spillage. In some systems, the operator must manually adjust speed of mixer drum 102 based on vehicle speed, acceleration, fullness, and road grade while driving concrete mixer truck 10. If the operator does not manually adjust speed of mixer drum 102 while driving concrete mixer truck 10, spillage of concrete contained within mixer drum 102 may occur. Advantageously, wet load drum mode 610 removes the need for the operator to manually adjust the mixer drum speed while driving and reduces the skillset needed to operate concrete mixer truck 10.

Admixture drum mode 612 causes mixer drum 102 to operate such that a mixture is properly mixed after it is added to mixer drum 102, according to an exemplary embodiment. Admixture drum mode 612 may cause mixer drum 102 to spin at a mixing drum speed for a settable or predetermined number of revolutions. In response to completing the selected or predetermined number of revolutions, mixer drum 102 may be transitioned into a constant speed mode (where mixer drum 102 rotates at a constant speed) or into smooth drum mode 606. Advantageously, admixture drum mode 612 reduces fuel usage by preventing mixer drum 102 from excessive/unneeded revolutions, increases drum life, and reduces the likelihood of over/under mixing the concrete in mixer drum 102. Additionally, admixture drum mode 612 advantageously removes the need for the operator to manually monitor the number of revolutions of mixer drum 102.

Aggressive drum mode 616 causes mixer drum 102 to operate without any ramping or smoothing features to smoothly reduce mixer drum momentum when a drum stop is engaged or when switching between charge and discharge, according to an exemplary embodiment. Aggressive drum mode 616 can be used to rock mixer drum 102 in the case of materials/concrete mixture stuck within mixer drum 102. Advantageously, this can be used to clear clogs, clumps, etc., to clear mixer drum 102. For example, when in aggressive drum mode 616, mixer drum 102 may be driven to rotate in a first direction for a predetermined amount of time or a predetermined angular distance, then suddenly stopped, then driven to rotate in an opposite direction.

In some embodiments, drum modes 601 includes an empty load drum mode and a dry load drum mode. In some embodiments, both empty load drum mode and dry load drum mode cause mixer drum 102 to spin at a low speed (e.g., less than 2 rpm). In some embodiments, empty load drum mode keeps mixer drum 102 spinning at a low speed to keep rollers of mixer drum 102 from flat spotting. In some embodiments, empty load drum mode causes mixer drum 102 to spin at an angular speed of less than 1 rpm. In some embodiments, empty load drum mode can be transitioned into after mixture has exited mixer drum 102 and mixer drum 102 is completely empty or nearly empty. In some embodiments, dry load drum mode causes mixer drum 102 to rotate at angular speed less than wet load drum mode 610. In some embodiments, dry load drum mode causes mixer drum 102 to rotate at an angular speed of approximately 1-1.5 rpm. In some embodiments, dry load drum mode causes mixer drum 102 to rotate just fast enough to keep material in mixer drum 102 and keep rollers of mixer drum 102 from flat spotting. In some embodiments, dry load drum mode can be transitioned into before water has been added to the mixture or if the mixture of mixer drum 102 is relatively dry.

As shown in FIG. 7, mode controller 704 of system 700 is configured to perform switching between various predetermined modes of operation, according to an exemplary embodiment. System 700 illustrates the information which mode controller 704 may receive and output to mixer drum 102 and chute 112 of concrete mixer truck 10 or to generate control signals (e.g., direction and/or speed) for mixer drum 102 and/or chute 112 of concrete mixer truck 10 to operate mixer truck 102 and/or chute 112 according to a selected mode. Mode controller 704 can receive mode selection commands from user interface device 702. User interface device 702 may include one or more display devices, buttons, switches, touchscreens, etc., configured to display a currently selected mode and configured to receive a user input to cause mixer drum 102 and/or chute 112 to operate according to one of drum modes 601 or to transition concrete mixer truck 10 between the various drum modes 601. In some embodiments, user interface device 702 includes (e.g., displays) GUI 600, facilitating selection of drum modes 601 and displaying various information (e.g., slump 604, pressure 618, drum speed 602, a currently selected drum mode, etc.).

Mode controller 704 may adjust an operation of mixer drum 102 and/or chute 112 to operate according to the selected drum mode, or may cause drum assembly controller 152 to operate according to the selected drum mode. In some embodiments, mode controller 704 is drum assembly controller 152 and/or incorporates some or all of the functionality of drum assembly controller 152 to adjust an operation of mixer drum 102 and/or chute 112. For example mode controller 704 may provide drum assembly controller 152 with setpoints (e.g., a drum speed setpoint), control signals, etc., and drum assembly controller 152 may use these setpoints and/or control signals to cause mixer drum 102 and/or chute 112 to operate according to the selected predefined mode of operation.

Mode controller 704 is shown receiving vehicle speed 708 ($v$), mixer drum speed 710 ($a$), mixer drum revolutions 712 (#rev), vehicle angle 714 ($\theta$), and mode selection. Mode controller 704 may receive any of this information from one or more sensors, systems, devices, etc., present on concrete mixer truck 10. For example, mode controller 704 may receive any of this information from a McNeilus FLEX Controls™ system present on concrete mixer truck 10. In another example, mode controller 704 receives mixer drum speed 710 from a speed sensor configured to measure an angular velocity of mixer drum 102. Similarly, mode controller 704 may directly receive any of vehicle speed 708, mixer drum speed 710, mixer drum revolutions 712, vehicle angle 714, etc., directly from sensors.

Vehicle speed 708 is a value of a present velocity of concrete mixer truck 10, according to some embodiments. For example, vehicle speed 708 may have units of miles per hour, meters per second, feet per second, etc. Mixer drum speed 710 is a value of a present angular velocity of mixer drum 102, according to some embodiments. Mixer drum revolutions 712 is a value of a number of revolutions completed over a time period, according to some embodiments. Vehicle angle 714 is a value of an orientation of concrete mixer truck 10 relative to a reference orientation, according to some embodiments. For example, vehicle angle 714 may indicate a current pitch of concrete mixer truck 10 (e.g., if concrete mixer truck 10 is positioned on a hill or an inclined surface). In some embodiments, vehicle angle 714 is received from an orientation sensor (e.g., a gyroscope) which indicates an orientation of concrete mixer truck 10. In some embodiments, vehicle angle 714 is an angle of turn of concrete mixer truck 10. In some embodiments, vehicle angle 714 is an angle of concrete mixer truck 10 relative to a spreading zone (e.g., a zone to be filled with mixture present in mixer drum 102).

Mode controller 704 uses the vehicle speed 708, mixer drum speed 710, mixer drum revolutions 712, and vehicle angle 714 in addition to the selected mode to determine at least one of direction and speed of mixer drum 102 and/or at least one of direction and speed of chute 112 to cause mixer drum 102 and/or chute 112 to operate according to the selected mode. In some embodiments, mode controller 704 stores a set of equations, relationships, rules, instructions, functions, programs, etc., associated with each of the drum modes 601 and based on the selected mode, operates to produce direction/speed of mixer drum 102 and/or direction/speed of chute 112 according to the selected mode. Mode controller 704 is described in greater detail below with reference to FIG. 8.

Figure 8:
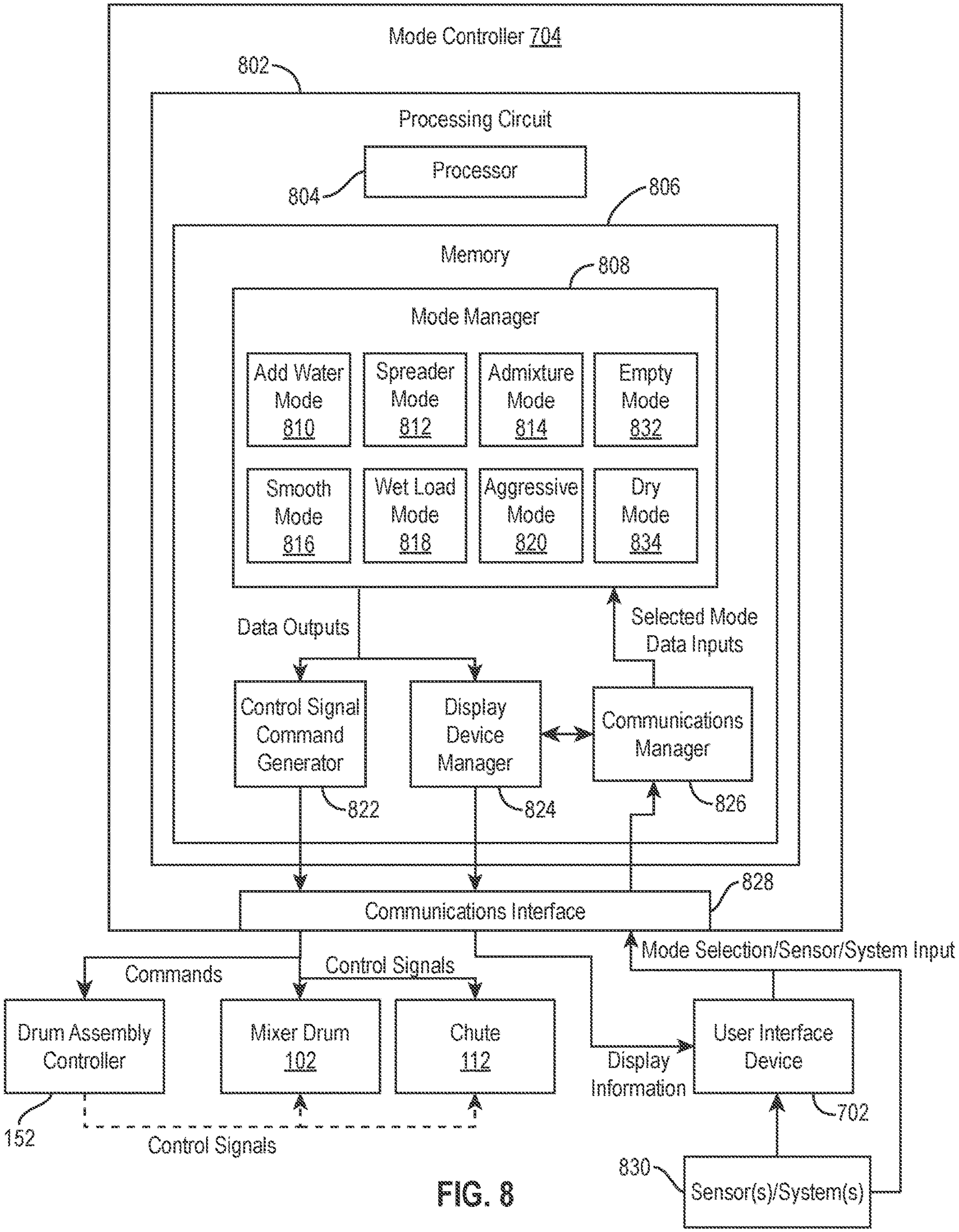
FIG. 8 is a block diagram of the mode controller of FIG. 7, according to an exemplary embodiment.

Referring now to FIG. 8, mode controller 704 is shown in greater detail, according to an exemplary embodiment. Mode controller 704 is configured to receive mode selection inputs from user interface device 702, sensor/system inputs from sensors/systems 830, and transition mixer drum 102 and/or chute 112 between various predefined modes of operation, according to some embodiments. In some embodiments, sensors/systems 830 include any sensors present on concrete mixer truck 10 and any systems (e.g., control systems, measurement systems, monitoring systems, vehicle electronic systems, etc.). For example, sensor/systems 830 may include one or more sensors and/or systems configured to measure and/or monitor mixer drum revolutions 712, mixer drum speed 710, vehicle angle 714, vehicle speed 708, a position of mixer drum 102, a position and speed of chute 112, etc. In some embodiments, sensor/systems 830 includes a McNeilus FLEX Controls™ system. In some embodiments, sensors/systems 830 are configured to communicably connect with user interface device 702 to display various information determined, measured, monitored, detected, etc., by sensors/systems 830. In some embodiments, sensors/systems 830 include sensors and/or systems configured to determine an event. In some embodiments, user interface device 702 is a component of sensors/systems 830. Mode controller 704 may receive any sensory information, sensor signals, mode selections (e.g., from user interface device 702, from sensors/systems 830, etc.) and determine commands for drum assembly controller 152 and/or control signals to directly control mixer drum 102 and/or chute 112 to operate according to the selected predefined mode of operation. In some embodiments, sensors/systems 830 is configured to monitor, measure, sense, detect, etc., any of vehicle speed 708, mixer drum speed 710, mixer drum revolutions 712, and vehicle speed 708, or any other information required for mode manager 808 to determine commands/control signals to operate mixer drum 102 and/or chute 112 according to a predefined mode.

In some embodiments, mode controller 704 uses commands received from user interface device 702 to transition mixer drum 102 and/or chute 112 between the various predefined modes of operation. In some embodiments, the command to transition between the various predefined modes of operation is an input at user interface device 702 including but not limited to any of actuating a button, actuating a switch, touching a touchscreen, etc. In some embodiments, user interface device 702 is configured to receive sensor/system information from sensors/systems 830 and either display information regarding various sensory inputs and/or information determined by one or more systems. In some embodiments, user interface device 702 or mode controller 704 is configured to analyze any of the sensor/system information received from sensors/systems 830 to determine if an event has occurred (e.g., a high slump event). In some embodiments, sensors/systems 830 are configured to provide mode controller with information regarding an event. In some embodiments, sensors/systems 830 are configured to analyze various sensor/system information to determine if an event has occurred which should be responded to with changing an operation of mixer drum 102 and/or chute 112 (e.g., transition into a different predefined mode of operation, transition between drum modes 601 in response to the event, etc.). In some embodiments, if an event occurs which should be responded to with a transition between drum modes 601, sensors/systems 830 provide mode controller 704 with at least one of the event which occurred and a determination of what drum mode 601 to transition into.

Referring still to FIG. 8, mode controller 704 includes a communications interface 828 and a processing circuit 802, according to some embodiments. Communications interface 828 may include wired or wireless interfaces (e.g., jacks, antennas, transmitters, receivers, transceivers, wire terminals, etc.) for conducting data communications with various systems, devices, sensors, or networks. For example, communications interface 828 may include an Ethernet card and port for sending and receiving data via an Ethernet-based communications network and/or a Wi-Fi transceiver for communicating via a wireless communications network. Communications interface 828 may be configured to communicate via local area networks or wide area networks (e.g., the Internet, a building WAN, etc.) and may use a variety of communications protocols (e.g., BACnet, IP, LON, etc.). In some embodiments, communications interface 828 is a universal serial bus interface and is configured to communicate serially with one or more various systems, devices, sensors, or networks. In some embodiments, communications interface 828 is any other serial communications interface.

Communications interface 828 may be a network interface configured to facilitate electronic data communications between mode controller 704 and various external systems or devices (e.g., user interface device 702, drum assembly controller 152, mixer drum 102, chute 112, sensors/systems 830, remote server 180, motor 126, motor 26, drum drive system 120, etc.). For example, mode controller 704 may receive mode selection and sensor/system inputs from user interface device 702 and/or sensors/systems 830 and output commands and/or control signals to drum assembly controller 152, mixer drum 102, chute 112, motor 126, engine 16, motor 26, etc. via communications interface 828.

Still referring to FIG. 8, processing circuit 802 is shown to include a processor 804 and memory 806, according to some embodiments. Processor 804 may be a general purpose or specific purpose processor, an application specific integrated circuit (ASIC), one or more field programmable gate arrays (FPGAs), a group of processing components, or other suitable processing components. Processor 804 may be configured to execute computer code or instructions stored in memory 806 or received from other computer readable media (e.g., CDROM, network storage, a remote server, etc.).

Memory 806 may include one or more devices (e.g., memory units, memory devices, storage devices, etc.) for storing data and/or computer code for completing and/or facilitating the various processes described in the present disclosure. Memory 806 may include random access memory (RAM), read-only memory (ROM), hard drive storage, temporary storage, non-volatile memory, flash memory, optical memory, or any other suitable memory for storing software objects and/or computer instructions. Memory 806 may include database components, object code components, script components, or any other type of information structure for supporting the various activities and information structures described in the present disclosure. Memory 806 may be communicably connected to processor 804 via processing circuit 802 and may include computer code for executing (e.g., by processor 804) one or more processes described herein.

Referring still to FIG. 8, memory 806 is shown to include mode manager 808, communications manager 826, display device manager 824, and control signal command generator 822, according to some embodiments. Communications manager 826 receives any of a mode selection, sensor/system inputs, and event inputs and determines if mode manager 808 should transition between drum modes 601 based on the received mode selection, sensor/system inputs, and even inputs, according to some embodiments. In some embodiments, communications manager 826 is configured to receive and analyze sensor/system information and determine if an event has occurred (e.g., slump has exceeded a predetermined threshold value, indicating an added water event) and cause mode manager 808 to transition into an appropriate mode (e.g., wet load mode 818 or add water mode 810). In some embodiments, communications manager 826 receives a command from user interface device 702 and causes mode manager 808 to transition between a first mode to a second mode (e.g., from add water mode 810 to smooth mode 816) based on the received command.

In some embodiments, communications manager 826 is configured to receive sensor/system inputs and convert the sensor/system inputs to a data form which mode manager 808 can use to determine data outputs. For example, in some embodiments, communications manager 826 receives a signal from an rpm sensor via communications interface 828, and determines an rpm value (a) based on the signal received from the rpm sensor. In some embodiments, communications manager 826 is configured to receive or determine an event and provide display device manager 824 with information regarding the type of event and any other relevant event information. In some embodiments, display device manager 824 uses the received event and relevant event information to provide a notification (e.g., an alert) regarding the event and the relevant event information. In some embodiments, communications manager 826 is configured to provide mode manager 808 with a command to transition from a first mode to a second mode (e.g., smooth mode 816 to spreader mode 812) and provides display device manager 824 with an indication regarding the mode transition. In some embodiments, display device manager 824 uses the indication to cause user interface device 702 to display an alert and/or notification regarding the mode transition. In some embodiments, communications manager 826 is configured to provide mode manager 808 with any of vehicle speed 708, mixer drum speed 710, mixer drum revolutions 712, and vehicle angle 714 as received from sensors/systems 830 via communications interface 828.

Referring still to FIG. 8, memory 806 includes mode manager 808, according to some embodiments. In some embodiments, mode manager 808 is configured to adjust an operation of at least mixer drum 102 and chute 112 to operate according to a predefined mode of operation. In some embodiments, mode manager 808 includes add water mode 810, spreader mode 812, admixture mode 814, smooth mode 816, wet load mode 818, aggressive mode 820, empty mode 832, and dry mode 834. In some embodiments, mode manager 808 includes a set of instructions (e.g., equations, functions, scripts, relationships, rules, data, etc.) for determining operational values (e.g., direction of rotation, speed of rotation) of mixer drum 102 and chute 112 such that mixer drum 102 and/or chute 112 operate according to one of modes 810-820 and 832-834. In some embodiments, mode manager 808 receives a command from communications manager 826 to transition into a predefined mode of operation (e.g., aggressive mode 820) and required informational inputs (e.g., at least one of vehicle speed 708, mixer drum speed 710, mixer drum revolutions 712, vehicle angle 714, etc.) to determine operational properties of mixer drum 102 and/or chute 112 such that mixer drum 102 and/or chute 112 operate according to the predefined mode. In some embodiments, any of the outputs of mode manager 808 may be referred to as control variables.

Referring still to FIG. 8, mode manager 808 is shown to include add water mode 810, according to some embodiments. In some embodiments, add water mode 810 is add water drum mode 614 as shown and described in greater detail above with reference to FIG. 6. In some embodiments, add water mode 810 can be implemented immediately after water is added to mixer drum 102 to sufficient mix the concrete/mixture present in mixer drum 102. When add water mode 810 is selected, mode manager 808 determines a speed at which mixer drum 102 should rotate and a number of revolutions mixer drum 102 complete, according to some embodiments. In some embodiments, add water mode 810 sets mixer drum speed 710 to a predetermined add water speed. In some embodiments, the predetermined add water speed of mixer drum 102 is greater than 7 rpm. In some embodiments, when in add water mode 810, mode manager 808 monitors a total number of revolutions completed, and continues causing mixer drum to operate at the predetermined add water speed until the total number of revolutions meets a predetermined number of revolutions. In some embodiments, the predetermined number of revolutions is a value based on an ASTM C94 standard and is 30 revolutions. In some embodiments, after the predetermined number of revolutions at the predetermined add water speed has been completed, mode manager 808 automatically transitions into a constant speed mode or smooth mode 816. In some embodiments, add water mode 810 causes mixer drum 102 to operate according to the following conditions:

$$\text{If:} rev_{total} < rev_{thresold} \text{ Then:} \omega = \omega AWM$$

$$\text{If } rev_{total} \geq rev_{thresold} \text{ Then:Transition Mode}$$

where $rev_{total}$ is a total number of revolutions completed since add water mode 810 was first implemented, a is an angular speed of mixer drum 102, $rev_{thresnold}$ is a predetermined number of revolutions for add water mode 810 (e.g., 30 revolutions as set by ASTM C94), and $d)_{A}$WM is a predetermined add water speed (e.g., >7 rpm).

In some embodiments, $rev_{thresnold}$ is a predefined value, while in other embodiments, $rev_{threshold}$ is a value set by a user before add water mode 810 is implemented. In some embodiments, $\omega_{AWM}$ is also settable by a user before add water mode 810 is implemented. In some embodiments, once the total number of completed revolutions satisfies/meets the total number of revolutions for add water mode 810, mode manager 808 transitions into another mode. For example, mode manager 808 may transition into smooth mode 816 after add water mode 810 has been completed (e.g., $rev_{total} \geq rev_{thresnold}$).

Advantageously, add water mode 810 facilitates proper mixing after water addition without the need for an operator/user to manually watch a drum counter, according to some embodiments. This may save fuel, increase life of mixer drum 102, and reduce the occurrence of under/over mixing concrete.

Referring still to FIG. 8, mode manager 808 includes admixture mode 814, according to some embodiments. In some embodiments, admixture mode 814 is admixture drum mode 612 as shown and described in greater detail above with reference to FIG. 6. In some embodiments, admixture mode 814 can be implemented immediately after an admixture is added to mixer drum 102 to sufficient mix the concrete/mixture present in mixer drum 102. In some embodiments, admixture mode 814 causes mixer drum 102 to operate similarly to add water mode 810. For example, admixture mode 814 may cause mixer drum 102 to rotate for a predefined number of revolutions at a predetermined mixer drum speed. However, in some embodiments, admixture mode 814 causes mixer drum 102 to rotate at an admixture mode speed, $\omega_{admixture}$, for a predetermined number of revolutions, $rev_{threshole,admixture}$. In some embodiments, the admixture mode drum speed $\omega_{mixture}$ is the same as $\omega_{AWM}$ (e.g., greater than 7 rpm). In some embodiments, the predetermined number of revolutions $rev_{threshole,admixture}$ for admixture mode 814 is different than $rev_{threshold}$. In some embodiments, the predetermined number of revolutions for admixture mode 814 is 70 revolutions as set by ASTM C94. Admixture mode 814 facilitates the same advantages of add water mode 810 by reducing the need for an operator to manually watch a drum counter and saving fuel, increasing life of mixer drum 102, and reducing the occurrence of over/under mixing concrete/mixture present in mixer drum 102, according to some embodiments.

Referring still to FIG. 8, mode manager 808 includes smooth mode 816, according to some embodiments. In some embodiments, smooth mode 816 is smooth drum mode 606 as shown and described in greater detail above with reference to FIG. 6. In some embodiments, smooth mode 816 is a standard mode of operation, and unless mode manager 808 transitions into one of the other modes, mode manager 808 defaults to causing mixer drum 102 to operate according to smooth mode 816. In some embodiments, smooth mode 816 causes mixer drum 102 to rotate at a predetermined smooth mode speed $\omega_{smooth}$ indefinitely. In some embodiments, $\omega_{smooth}$ is less than $\omega_{admixture}$ and $\omega_{AWM}$. In some embodiments, mode manager 808 returns to smooth mode 816 in response to a key cycle (e.g., ignition).

Referring still to FIG. 8, mode manager 808 includes wet load mode 818, according to some embodiments. In some embodiments, wet load mode 818 is wet load drum mode 610 as shown and described in greater detail above with reference to FIG. 6. In some embodiments, when mode manager 808 is in wet load mode 818, mixer drum 102 is kept rotating faster when concrete mixer truck 10 is moving at a slower speed. Advantageously, this keeps material/concrete/cement present in mixer drum 102 further forwards (e.g., towards cab 14).

Advantageously, this may prevent wet loads from spilling out of mixer drum 102. In some embodiments, wet load mode 818 causes mixer drum 102 to rotate at a wet load speed $\omega_{wet}$. In some embodiments, $\omega_{wet}$ is inversely proportional to a speed of concrete mixer truck 10, v: $\omega_{wet} \partial 1/v$. In some embodiments, wet load mode 818 determines $\omega_{wet}$ based on speed v of concrete mixer truck 10 and a current speed of mixer drum 102. This relationship is shown as:

$$\omega_{wet}=f_{wet}(v,\omega_{current})$$

where $\omega_{current}$ is a current speed of mixer drum 102, and $f_{wet}$ is a function (e.g., linear, non-linear, etc.) relating $\omega_{wet}$ to the speed v of concrete mixer truck 10 and the current speed $\omega_{current}$ of mixer drum 102, according to some embodiments. In some embodiments, wet load mode 818 determines an amount to increase or decrease the current speed of mixer drum 102 based on the current speed of mixer drum 102 and the speed v of concrete mixer truck 10. In some embodiments, the increase or decrease is determined by:

$$\Delta\omega_{current}=f_{\Delta}(v,\omega_{current})$$

where $\Delta\omega_{current}$ is an amount to increase or decrease $\omega_{current}$ to achieve $\omega_{wet}$, and $f_{\Delta}$ is a function relating $\Delta\omega_{current}$ to v and $\omega_{current}$.

Wet load mode 818 may be activated by an operator when a full load with a high slump is present in mixer drum 102 (usually before leaving the plant). Advantageously, wet load mode 818 removes the need for the operator to manually control the speed of mixer drum 102 while driving. In some embodiments, wet load mode 818 includes rotating or driving mixer drum 102 at a specific speed for a full load with a high slump.

Referring still to FIG. 8, mode manager 808 includes spreader mode 812, according to some embodiments. In some embodiments, spreader mode 812 is spreader drum mode 608 as shown and described in greater detail above with reference to FIG. 6. In some embodiments, spreader drum mode 608 is activated by an operator for spreading a cement slurry contained in mixer drum 102. In some embodiments, when mode manager 808 is in spreader mode 812, mode manager 808 controls an operation of mixer drum 102 and chute 112 to deliver and spread the cement slurry mixture. In some embodiments, spreader mode 812 includes determining at least one of when to start rotating mixer drum 102, when to stop rotating mixer drum 102, speed of mixer drum 102, pivoting speed of chute 112, a direction which chute 112 should pivot, a distance (e.g., an angle) that chute 112 should pivot in each direction to spread the slurry mixture, an amount of time that chute 112 should pivot in each direction to spread the slurry mixture, etc., based on vehicle speed 708 and vehicle angle 714. In some embodiments, spreader mode 812 determines a discharge speed, $v_{discharge}$, and a drum speed, $\omega_{discharge,drum}$ to provide the cement of mixer drum 102 to a receiving site/area at a constant volumetric flow rate. In some embodiments, spreader mode 812 determines a speed at which to pivot chute 112 in each direction such that a certain amount of mixture (e.g., concrete, cement, etc.) is delivered to the receiving site/area.

In some embodiments, mode manage 808, when operating in spreader mode 812, receives an input from user interface device 702 regarding a desired depth of concrete, $d_{concrete}$, for the receiving area, an angular displacement of chute 112 in a first direction (e.g., counterclockwise), $\theta_1$, and an angular displacement of chute 112 in a second direction (e.g., clockwise), $\theta_2$. In some embodiments, $\theta_1$ and $\theta_2$ indicate a width of the receiving site/area which the mixture is to be delivered to.

In some embodiments, $d_{concrete}$, $\theta_1$, and $\theta_2$ are used to in addition to vehicle speed 708 (v) and vehicle angle 714 (θ) to determine operations of mixer drum 102 and chute 112 to provide material/mixture from mixer drum 102 to the receiving area at a constant rate. For example, as concrete mixer truck 10 drives forwards, at least one of $\omega_{discharge,drum}$ and a pivoting speed of chute 112 ($\omega_{chute}$) increases such that material/mixture is provided to the receiving area, regardless of vehicle speed 708. In some embodiments, $\omega_{chute}$ and $\omega_{discharge,drum}$ are limited to maximum speed, and therefore the operator must not operate concrete mixer truck 10 such that vehicle speed 708 exceeds a predetermined threshold value. In some embodiments, vehicle speed 708 is limited to a maximum value, $v_{vehicle,max}$. In some embodiments, as long as vehicle speed 708 remains below the maximum value $v_{vehicle,max}$, the concrete/mixture is evenly distributed throughout the receiving area.

In some embodiments, $\omega_{discharge,drum}$ and $\omega_{chute}$ are determined based on time-values. For example, in some embodiments, a first amount of time $t_1$ for chute 112 to rotate/move in a first direction, and a second amount of time $t_2$ for chute 112 to rotate in a second direction, opposite the first direction, are input through user interface device 702. In some embodiments, the first amount of time and the second amount of time are determined based on $\theta_1$ and $\theta_2$. In some embodiments, a current position of chute 112 is determined by receiving information from a sensor configured to detect a position of chute 112. In some embodiments, the sensor is a proximity sensor, configured to sense if chute 112 is centered. In some embodiments, spreader mode 812 centered chute 112 before implementing automatic control of mixer drum 102 and chute 112.

In some embodiments, spreader mode 812 causes user interface device 702 to prompt an operator of concrete mixer truck 10 to input required parameters. In some embodiments, the required parameters include at least one of $\theta_1$, $\theta_2$, $t_1$, $t_2$, and $d_{concrete}$. Spreader mode 812 uses the input parameters in addition to vehicle speed v and vehicle angle θ to determine $\omega_{discharge,drum}$ and $\omega_{chute}$ to facilitate delivery of the mixture/concrete/cement to the receiving area at the desired thickness $d_{concrete}$, according to some embodiments.

Advantageously, automatically determining $\omega_{discharge,drum}$ and $\omega_{chute}$ facilitates easy spreading/discharge of mixture (e.g., concrete, cement, etc.) present in mixer drum 102 to a receiving site, according to some embodiments. An operator can position concrete mixer truck 10 near the receiving area such that chute 112 is above the receiving area and can implement spreader mode 812 through user interface device 702. The operator may be prompted to input required parameters (e.g., $d_{concrete}$, $\theta_1$, $\theta_2$, etc.). After the operator has input the required parameters and spreader mode 812 is engaged, the operator can pull concrete mixer truck 10 forwards (or backwards depending on which end of concrete mixer truck 10 chute 112 is positioned at), and spreader mode 812 automatically determines operations of mixer drum 102 and chute 112 (e.g., $\omega_{discharge,drum}$, $\omega_{chute}$) to provide the mixture to the receiving site across the range specified by the operator (e.g., from $\theta_1$ to $\theta_2$) at the required rate/with the required thickness/depth ($d_{concrete}$). Advantageously, this removes the need for manually moving or controlling chute 112 and mixer drum 102 to deliver the mixture to the receiving area, according to some embodiments. In some embodiments, the operator can manually input (e.g., at user interface device 702) any of the parameters/values which spreader mode 812 determines automatically or uses to determine the operational values of mixer drum 102 and/or chute 112 (e.g., $\omega_{discharge,drum}$, $\omega_{chute}$, $t_1$, $t_2$, $v_{discharge}$, volumetric discharge rate, etc.).

Referring still to FIG. 8, mode manager 808 includes aggressive mode 820, according to some embodiments. In some embodiments, aggressive mode 820 is aggressive drum mode 616 as shown and described in greater detail above with reference to FIG. 6. In some embodiments, aggressive mode 820 causes mixer drum 102 to operate to clear clogged or built up mixture present within mixer drum 102. For example, if during spreader mode 812, mixer drum 102 and/or any components between mixer drum 102 and chute 112 to facilitate egress of the mixture from mixer drum 102 to chute 112 become clogged, mode manager 808 can transition mixer drum 102 into aggressive mode 820. In some embodiments, mode manager 808 automatically transitions into spreader mode 812 in response to a received event (e.g., a blockage/clog/build up event). In some embodiments, mode manager 808 transitions into spreader mode 812 in response to a manual command received from user interface device 702. For example, if an operator sees that mixer drum 102 is clogged, the operator may manually transition mixer drum 102 into aggressive mode 820 by inputting a command at user interface device 702.

Aggressive mode 820 may cause mixer drum 102 to actuatably start and stop rotating. In some embodiments, aggressive mode 820 does not incorporate any ramping or smoothed stopping functions. For example, McNeilus FLEX ControlsTMincludes a Smooth Drum Stop technology which smoothly reduces drum momentum when a drum stop is engaged. In some embodiments, aggressive mode 820 implements a drum stop but does not use the Smooth Drum Stop technology.

In some embodiments, aggressive mode 820 includes rocking mixer drum 102 back and forth to clear any blockages or clogging. In some embodiments, aggressive mode 820 causes mixer drum 102 to rotate a certain amount or for a certain amount of time in a first direction at a first angular speed (e.g., $\omega_1$), then rapidly decelerates mixer drum 102, bringing mixer drum 102 to a complete stop. In some embodiments, this is repeated a predetermined number of times. In some embodiments, this is repeated until a clogging or a buildup is mitigated. In some embodiments, after causing mixer drum 102 to rotate the certain amount or for the certain amount of time in the first direction at the first angular speed, mixer drum 102 is caused to rotate in an opposite direction for a second amount of time or for a second certain amount. In this way, mixer drum 102 is rocked back and forth (e.g., clockwise, then counter clockwise) and the inertial forces and momentum of mixer drum 102 cause any blockages or clogging or buildups of material within mixer drum 102 to be cleared.

Advantageously, aggressive mode 820 facilitates easy un-clogging of mixer drum 102 and/or any other components which concrete/mixture/material may build up on, according to some embodiments. This removes the need for an operator to manually unclog mixer drum 102. In some embodiments, the rocking of mixer drum 102 is performed such that excessive inertial/momentum forces are not introduced to mixer drum 102 or components which mount mixer drum 102 to concrete mixer truck 10. In some embodiments, aggressive mode 820 can only be activated/transitioned into if concrete mixer truck 10 is stationary, or if vehicle speed 708 is less than a maximum threshold value (e.g., 10 mph).

Referring still to FIG. 8, memory 806 includes empty mode 832 and dry mode 834, according to some embodiments. In some embodiments, empty mode 832 is empty load drum mode and dry mode 834 is dry load drum mode as described above with reference to FIG. 6. In some embodiments, both empty mode 832 and dry mode 834 cause mixer drum 102 to spin at a low speed (e.g., less than 2 rpm). In some embodiments, empty mode 832 keeps mixer drum 102 spinning at a low speed to keep rollers of mixer drum 102 from flat spotting. In some embodiments, empty mode 832 causes mixer drum 102 to spin at an angular speed of less than 1 rpm. In some embodiments, empty mode 832 can be transitioned into after mixture has exited mixer drum 102 and mixer drum 102 is completely empty or nearly empty (e.g., in response to mode controller 704 determining that mixer drum 102 is empty). In some embodiments, dry mode 834 causes mixer drum 102 to rotate at angular speed less than wet load mode 818. In some embodiments, dry mode 834 causes mixer drum 102 to rotate at an angular speed of approximately 1-1.5 rpm. In some embodiments, dry mode 834 causes mixer drum 102 to rotate fast enough to keep material in mixer drum 102 and prevent rollers of mixer drum 102 from flat spotting. In some embodiments, dry mode 834 can be transitioned into before water has been added to the mixture or if the mixture of mixer drum 102 is relatively dry.

In some embodiments, mode controller 704 automatically transitions into either dry mode 834 or empty mode 832 in response to determining that mixer drum 102 is empty, or in response to a command from user interface device 702. For example, if mode controller 704 receives an indication that the mixture within mixer drum 102 is dry, mode controller 704 can automatically transition into dry mode 834. Likewise, if mode controller 704 receives an indication that there is no material/mixture within mixer drum 102, or there is a negligible amount of material/mixture within mixer drum 102, mode controller 704 can transition into empty mode 832.

Referring still to FIG. 8, memory 806 includes control signal/command generator 822 and display device manager 824, according to some embodiments. In some embodiments, mode manager 808 is configured to output data regarding operational settings of mixer drum 102 and/or chute 112 to cause mixer drum 102 and/or chute 112 to operate according to the selected mode. In some embodiments, control signal/command generator 822 is configured to determine/generate control signals and provide the control signals to mixer drum 102 and/or chute 112 to cause mixer drum 102 and/or chute 112 to operate according to the output data from mode manager 808. For example, if mode manager 808 outputs a drum speed of 10 rpm, control signal/command generator 822 may generate control signals to cause mixer drum 102 to rotate at the drum speed of 10 rpm. In some embodiments, control signal/command generator 822 outputs the control signals to an element (e.g., a mover) configured to control a desired operation of mixer drum 102 and/or chute 112. For example, control signal/command generator 822 may output control signals to one or more motors, actuators, engines, etc., to cause mixer drum 102 and/or chute 112 to operate according to the operation/data as determined by mode manager 808.

In some embodiments, control signal/command generator 822 is configured to output a command to a controller (e.g., drum assembly controller 152) to cause mixer drum 102 and/or chute 112 to function according to the determined operation (e.g., as determined by mode manager 808). In some embodiments, control signal/command generator 822 is configured to output a command to a system, controller, device, etc., which is configured to generate control signals for mixer drum 102 and/or chute 112 to adjust an operation of mixer drum 102 and/or chute 112. In some embodiments, control signal/command generator 822 outputs any of the command and the control signal via communications interface 828. In some embodiments, the command and/or the control signal(s) are transmitted wirelessly to a controller or device (e.g., drum assembly controller 152 and motor 126). In some embodiments, the command(s) and/or the control signal(s) are transmitted via a wired connection between communications interface 828 and one or more controllers, motors, systems, etc., configured to adjust an operation of mixer drum 102 and/or chute 112.

In some embodiments, display device manager 824 is configured to cause user interface device 702 to display information regarding a selected mode. In some embodiments, display device manager 824 receives the data outputs/determined operational values of mixer drum 102 and/or chute 112 from mode manager 808 and causes user interface device 702 to display the data outputs/determined operational values of mixer drum 102 and/or chute 112. For example, if mode manager 808 outputs $\omega_{discharge,drum}=-7$ rpm, display device manager 824 may cause user interface device 702 to display a notification that indicates the present value (i.e., −7 rpm) of $\omega_{discharge,drum}$.

Figure 9:
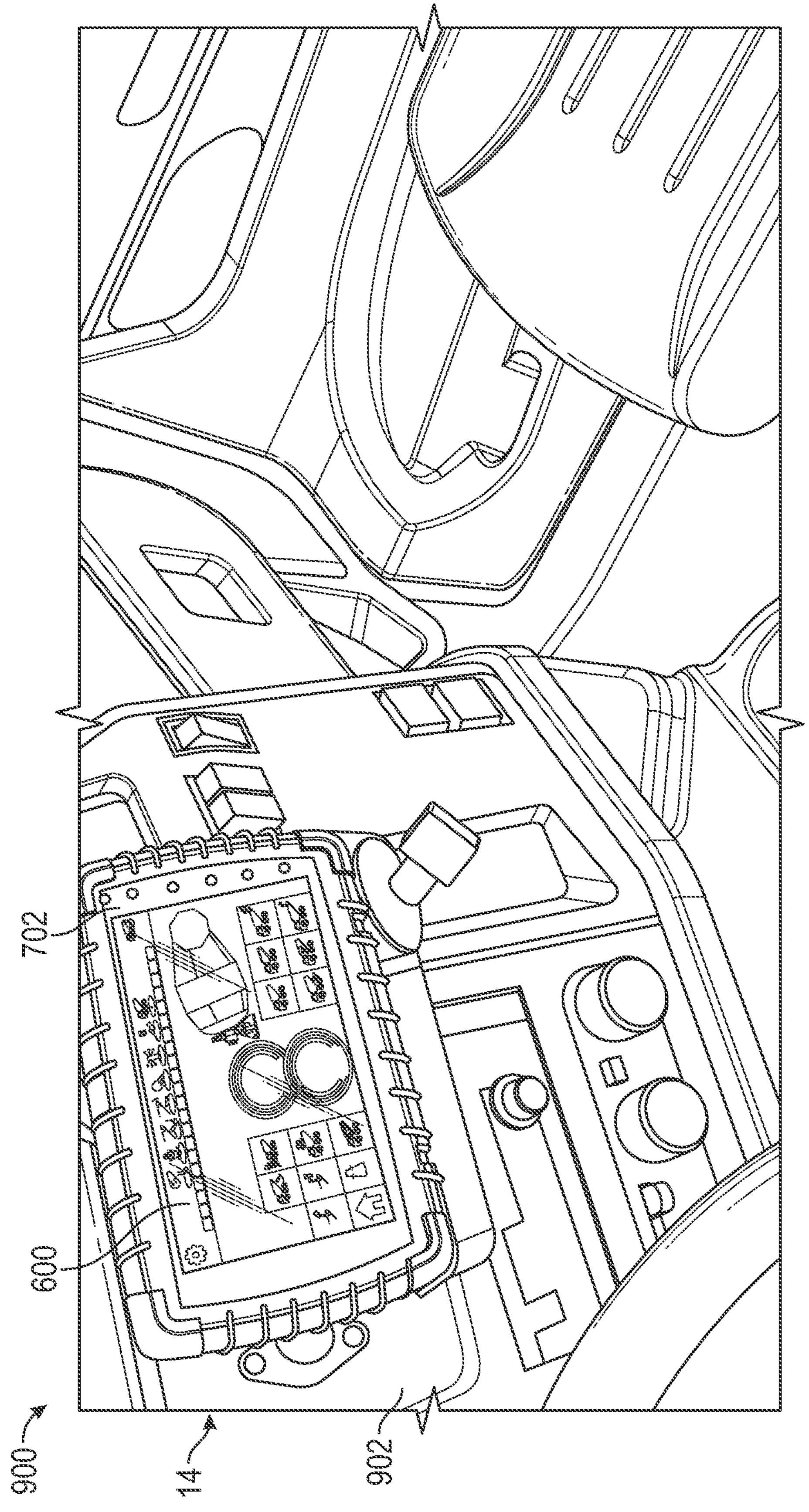
FIG. 9 is an interior view of a cab of the concrete mixer truck of FIG. 1, shown to include a display device, according to an exemplary embodiment.

Referring now to FIG. 9, display system 900 includes user interface device 702 positioned within cab 14 of concrete mixer truck 10, according to some embodiments. In some embodiments, user interface device 702 is configured to display GUI 600 to provide notifications, messages, alerts, etc., to an operator of concrete mixer truck 10. In some embodiments, user interface device 702 is a touchscreen device, configured to receive an input from the operator to transition mixer drum 102 and/or chute 112 between various predefined modes of operation, as described in greater detail above with reference to FIGS. 6 and 8. In some embodiments, user interface device 702 is mounted to a dashboard 902 of cab 14.

Figure 10:
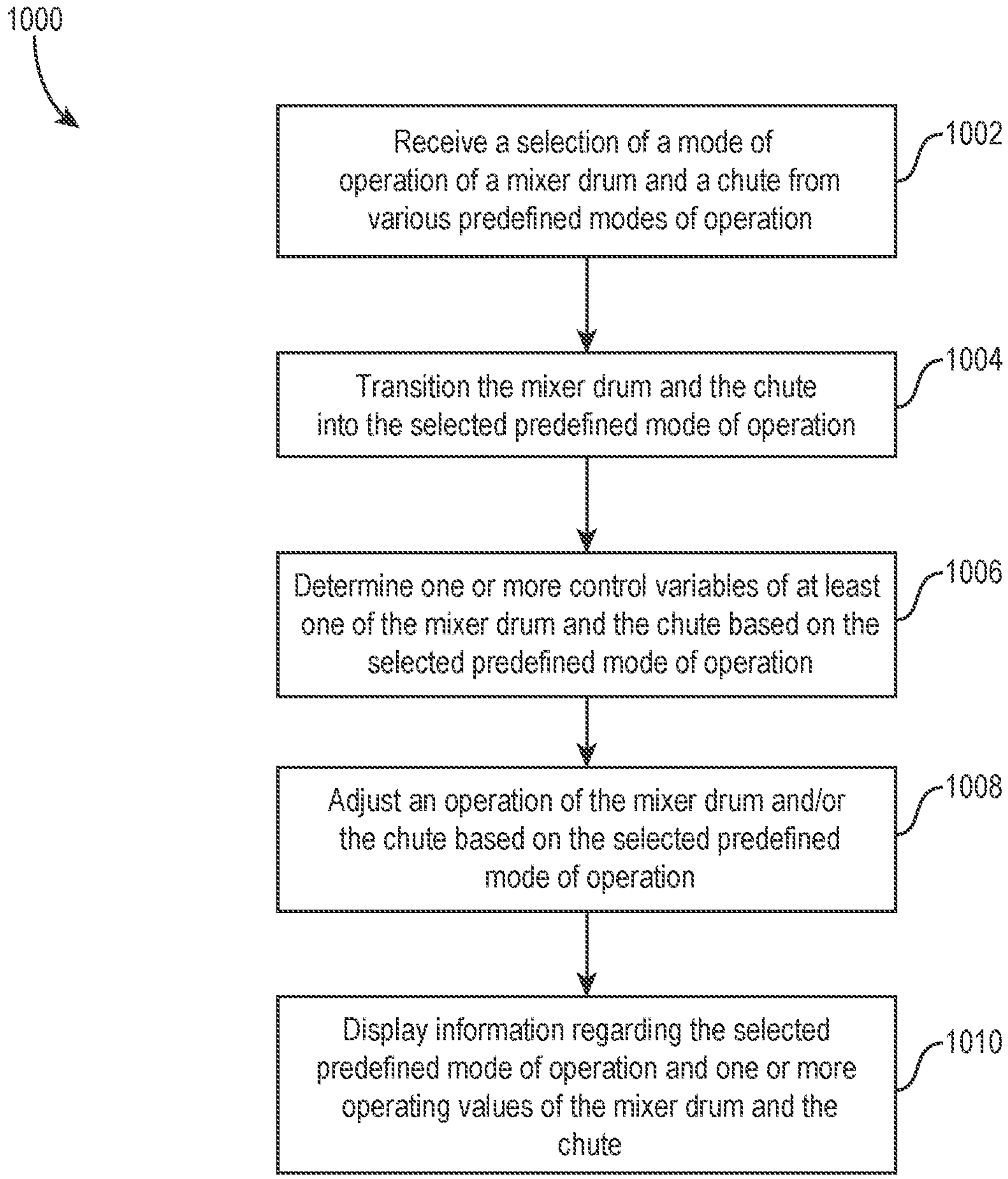
FIG. 10 is a method for selectably transitioning a concrete mixer truck between various predefined modes of operation, according to an exemplary embodiment.

Referring now to FIG. 10, a method 1000 for transitioning a concrete mixer truck between various predefined modes of operation is shown, according to some embodiments. In some embodiments, method 1000 may be performed by mode controller 704, user interface device 702, and drum assembly controller 152, or any other device, system, controller, etc., configured to control an operation of mixer drum 102 and/or chute 112.

Method 1000 includes receiving a selection of a mode of operation of a mixer drum (e.g., mixer drum 102) and a chute (e.g., chute 112) from various predefined modes of operation (step 1002), according to some embodiments. In some embodiments, step 1002 includes receiving the selection from a user interface device. In some embodiments, the received selection is an event. In some embodiments, the event indicates a transition from one predefined mode to another predefined mode of operation of the mixer drum and the chute. In some embodiments, the selection and/or the event are received by mode controller 704 (or more specifically, communications manager 826) via communications interface 828. In some embodiments, the various predefined modes of operation include but are not limited to an add water mode, a spreader mode, an admixture mode, a smooth mode, a wet load mode, and an aggressive mode.

Method 1000 includes transitioning the mixer drum and the chute into the selected predefined mode of operation (step 1004), according to some embodiments. In some embodiments, step 1004 is performed by mode controller 704 or, more particularly, mode manager 808. In some embodiments, the mixer drum and the chute are selected into the predefined mode of operation in response to at least one of an event, a selected input, etc.

Method 1000 includes determining one or more control variables of at least one of the mixer drum and the chute based on the selected predefined mode of operation (step 1006), according to some embodiments. In some embodiments, the one or more control variables are determined by mode controller 704 or more specifically mode manager 808 of mode controller 704. In some embodiments, the one or more control variables are determined using at least one of an equation, a set of equations, a set of rules, a function, a lookup table, etc., corresponding the selected predefined mode of operation. In some embodiments, each of the various predefined modes of operation includes a corresponding equation, set of equations, set of rules, function, or lookup table, etc., used to determine one or more control variables for the mixer drum (e.g., mixer drum 102) and the chute (e.g., chute 112) for the selected predefined mode of operation. In some embodiments, the one or more control variables are used to determine control signals for controllable elements (e.g., mixer drum 102, chute 112) to adjust an operation of the controllable elements. In some embodiments, mode controller 704 is configured to use the one or more control variables to determine control signals for the controllable elements. In some embodiments, mode controller 704 is configured to provide the one or more control variables to another controller, system, device, etc., configured to use the one or more control variables to generate control signals for the controllable elements to implement the selected predefined mode of operation.

Method 1000 includes adjusting an operation of the mixer drum (e.g., mixer drum 102) and/or the chute (e.g., chute 112) based on the selected predefined mode of operation (step 1008), according to some embodiments. In some embodiments, the operation of the mixer drum and/or the chute are adjusted based on the one or more control variables determined in step 1006. In some embodiments, the operation of the mixer drum and/or the chute are adjusted based on the control variables determined in step 1006 and one or more operational values of the concrete mixer truck, or the mixer drum, or the chute (e.g., v of the truck, ω of the mixer drum, etc.). In some embodiments, step 1008 is performed by mode controller 704. In some embodiments, step 1008 is performed by another controller configured to communicably connect with mode controller 704, receive the one or more control variables, and generate control signals to adjust an operation of the mixer drum and/or the chute.

Method 1000 includes displaying information regarding the selected predefined mode of operation and one or more operating values of the mixer drum and/or the chute (step 1010), according to some embodiments. In some embodiments, step 1010 is performed by mode controller 704 and/or user interface device 702. In some embodiments, user interface device 702 displays information regarding the selected predefined mode of operation to a user (e.g., an operator of the concrete mixer truck). In some embodiments, the one or more operation values of the mixer drum and the chute are live-values, indicating a present operational status of the mixer drum and/or the chute.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, by way of example, instructions and data which cause a general purpose computer, special purpose computer, or special purpose processing machines to perform a certain function or group of functions.

As utilized herein, the terms “approximately”, “about”, “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term “exemplary” as used herein to describe various embodiments is intended to indicate that such embodiments are possible examples, representations, and/or illustrations of possible embodiments (and such term is not intended to connote that such embodiments are necessarily extraordinary or superlative examples).

The terms “coupled,” “connected,” and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., “top,” “bottom,” “above,” “below,” etc.) are merely used to describe the orientation of various elements in the FIGURES. It should be noted that the orientation of various elements may differ according to other exemplary embodiments, and that such variations are intended to be encompassed by the present disclosure.

Also, the term “or” is used in its inclusive sense (and not in its exclusive sense) so that when used, for example, to connect a list of elements, the term “or” means one, some, or all of the elements in the list. Conjunctive language such as the phrase “at least one of X, Y, and Z,” unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A control system for a mixer vehicle comprising:
- processing circuitry configured to:
  - obtain a selection of a mode out of a plurality of different modes of operation, the plurality of different modes of operation comprising an add water mode, and at least one of a spreader mode, an admixture mode, a smooth mode, a wet load mode, an aggressive mode, an empty load mode, or a dry mode; and
  - control operation of a mixer drum and a chute of the mixer vehicle according to the selected mode;
  - wherein controlling operation of the mixer drum and the chute according to the add water mode comprises:
    - driving the mixer drum at an add water speed;
    - counting a number of revolutions of the mixer drum since a time at which the mixer vehicle was transitioned into the add water mode; and
    - transitioning the mixer vehicle out of the add water mode in response to the number of revolutions reaching or exceeding a threshold amount.

2. The control system of claim 1, wherein the add water speed is greater than or equal to seven revolutions per minute.

3. The control system of claim 1, wherein each of the plurality of different modes of operation comprise operating the mixer drum or the chute using at least one of a number of revolutions of the mixer drum, an angular speed of the mixer drum, an angular position of the mixer drum, or a speed of the mixer vehicle.

4. The control system of claim 1, wherein the processing circuitry is configured to transition the mixer vehicle into the admixture mode after detecting or receiving an input that an admixture is added to the mixer drum;

wherein the processing circuitry is configured to operate the mixer vehicle according to the admixture mode by operating the mixer drum to drive at an admixture speed for a predetermined number of revolutions; and wherein the processing circuitry is configured to operate the mixer vehicle according to the smooth mode by operating the mixer drum to drive at a speed less than the admixture speed.

5. The control system of claim 1, wherein the processing circuitry is configured to operate the mixer vehicle according to the wet load mode by increasing a speed of the mixer drum as a speed of the mixer vehicle decreases to drive mixture within the mixer drum towards an end of the mixer drum.

6. The control system of claim 1, wherein the processing circuitry is configured to operate the mixer vehicle according to the spreader mode by operating the mixer drum to rotate at a spreading speed and operating the chute to reciprocate at a specific angular speed to achieve a desired depth of mixture over a desired area.

7. The control system of claim 1, wherein the processing circuitry is configured to operate the mixer vehicle according to the aggressive mode by operating the mixer drum to rock to dislodge materials within the mixer drum.

8. The control system of claim 1, wherein the processing circuitry is configured to operate the mixer vehicle according to the empty load mode or the dry mode by operating the mixer drum to rotate at a speed of 2 revolutions per minute or less.

9. The control system of claim 1, wherein the processing circuitry is configured to transition the mixer vehicle between the plurality of different modes of operation in response to a user input or automatically in response to detecting a condition at the mixer vehicle.

10. A control system for a mixer vehicle comprising:

processing circuitry configured to:

obtain a selection of a mode out of a plurality of different modes of operation, the plurality of different modes of operation comprising an admixture mode, a smooth mode, and at least one of an add water mode, a spreader mode, a wet load mode, an aggressive mode, an empty load mode, or a dry mode; and control operation of a mixer drum and a chute of the mixer vehicle according to the selected mode;

wherein controlling operation the mixer drum and the chute according to the admixture mode comprises operating the mixer drum to rotate at an admixture speed for a predetermined number of revolutions to mix an admixture; and wherein controlling operation of the mixer drum and the chute according to the smooth mode comprises operating the mixer drum to drive at a speed less than the admixture speed.

11. The control system of claim 10, wherein controlling operation of the mixer drum and the chute according to the add water mode comprises:

driving the mixer drum at an add water speed that is greater than or equal to seven revolutions per minute;

counting a number of revolutions of the mixer drum since a time at which the mixer vehicle was transitioned into the add water mode; and transitioning the mixer vehicle out of the add water mode in response to the number of revolutions reaching or exceeding a threshold amount.

12. The control system of claim 10, wherein the processing circuitry is configured to operate the mixer vehicle according to the wet load mode by increasing a speed of the mixer drum as a speed of the mixer vehicle decreases to drive mixture within the mixer drum towards an end of the mixer drum.

13. The control system of claim 10, wherein the processing circuitry is configured to operate the mixer vehicle according to the spreader mode by operating the mixer drum to rotate at a spreading speed and operating the chute to reciprocate at a specific angular speed to achieve a desired depth of mixture over a desired area.

14. The control system of claim 10, wherein the processing circuitry is configured to operate the mixer vehicle according to the aggressive mode by operating the mixer drum to rock to dislodge materials within the mixer drum.

15. The control system of claim 10, wherein the processing circuitry is configured to operating the mixer vehicle according to the empty load mode or the dry mode by operating the mixer drum to rotate at a speed of 2 revolutions per minute or less.

16. The control system of claim 10, wherein the processing circuitry is configured to transition the mixer vehicle between the plurality of different modes of operation in response to a user input or automatically in response to detecting a condition at the mixer vehicle.

17. A control system for a mixer vehicle comprising:

processing circuitry configured to:

obtain a selection of a mode out of a plurality of different modes of operation, the plurality of different modes of operation comprising an add water mode, an admixture mode, a smooth mode, and at least one of a spreader mode, a wet load mode, an aggressive mode, an empty load mode, or a dry mode; and control operation of a mixer drum and a chute of the mixer vehicle according to the selected mode;

wherein controlling operation of the mixer drum and the chute according to the add water mode comprises:

driving the mixer drum at an add water speed;

counting a number of revolutions of the mixer drum since a time at which the mixer vehicle was transitioned into the add water mode; and transitioning the mixer vehicle out of the add water mode in response to the number of revolutions reaching or exceeding a threshold amount;

wherein controlling operation the mixer drum and the chute according to the admixture mode comprises operating the mixer drum to rotate at an admixture speed for a predetermined number of revolutions to mix an admixture; and wherein controlling operation of the mixer drum and the chute according to the smooth mode comprises operating the mixer drum to drive at a speed less than the admixture speed.

18. The control system of claim 17, wherein the add water speed is greater than or equal to seven revolutions per minute.

19. The control system of claim 17, wherein the processing circuitry is configured to operate the mixer vehicle according to the wet load mode by increasing a speed of the mixer drum as a speed of the mixer vehicle decreases to drive mixture within the mixer drum towards an end of the mixer drum.

20. The control system of claim 17, wherein the processing circuitry is configured to operate the mixer vehicle according to the aggressive mode by operating the mixer drum to rock to dislodge materials within the mixer drum.

* * * * *